United States Patent
Li et al.

(10) Patent No.: US 10,750,031 B2
(45) Date of Patent: Aug. 18, 2020

(54) TARIFF DATA DETERMINING METHOD AND APPARATUS FOR CREATING THE SAME

(71) Applicant: HUAWEI TECHNOLOGIES CO., LTD., Shenzhen (CN)

(72) Inventors: Zhengbing Li, Shenzhen (CN); Fangshan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/573,217

(22) Filed: Sep. 17, 2019

(65) Prior Publication Data

US 2020/0014803 A1 Jan. 9, 2020

Related U.S. Application Data

(63) Continuation of application No. PCT/CN2018/073850, filed on Jan. 23, 2018.

(30) Foreign Application Priority Data

Mar. 21, 2017 (CN) .......................... 2017 1 0173476

(51) Int. Cl.
*H04M 15/00* (2006.01)

(52) U.S. Cl.
CPC ............................ *H04M 15/8022* (2013.01)

(58) Field of Classification Search
USPC ........ 379/133, 114, 114.06, 220.01, 126, 22, 379/112.03, 114.21, 114.24, 112.01, 379/114.29, 104.1, 111
See application file for complete search history.

(56) References Cited

U.S. PATENT DOCUMENTS

| | | | | |
|---|---|---|---|---|
| 7,515,697 | B2 * | 4/2009 | Eng ........................ | G06Q 30/04 379/114.01 |
| 2004/0009762 | A1 * | 1/2004 | Bugiu .................... | G06Q 30/02 455/406 |
| 2008/0205381 | A1 * | 8/2008 | Zhu ..................... | H04M 15/853 370/352 |

(Continued)

FOREIGN PATENT DOCUMENTS

| CN | 101296093 A | 10/2008 |
|---|---|---|
| CN | 101827346 A | 9/2010 |

(Continued)

*Primary Examiner* — Maria El-Zoobi
(74) *Attorney, Agent, or Firm* — Rimon PC

(57) ABSTRACT

A tariff data determining method and apparatus are disclosed. The method includes: obtaining a call detail record set, wherein each call detail record includes a charging condition, a charging unit and a fee deduction that are under the charging condition; grouping a plurality of call detail records to obtain a call detail record group, wherein a same value corresponding to a charging unit in the call detail record group has a correspondence with a unique fee value corresponding to a fee deduction; analyzing the call detail record group to obtain a data feature; selecting a target tariff model corresponding to the data feature; determining a parameter value corresponding to each tariff parameter in the target tariff model; and determining tariff data based on the parameter value, the target tariff model, and the charging condition.

18 Claims, 8 Drawing Sheets

(56) References Cited

U.S. PATENT DOCUMENTS

| | | | |
|---|---|---|---|
| 2010/0153246 A1* | 6/2010 | D'Englere | H04M 15/43 |
| | | | 705/34 |
| 2011/0184961 A1* | 7/2011 | Aertebjerg | H04L 12/14 |
| | | | 707/754 |
| 2015/0043388 A1 | 2/2015 | Lu et al. | |
| 2015/0319313 A1 | 11/2015 | Lifshitz et al. | |
| 2016/0330329 A1 | 11/2016 | Xia | |

FOREIGN PATENT DOCUMENTS

| | | |
|---|---|---|
| CN | 102231876 A | 11/2011 |
| CN | 103841541 A | 6/2014 |
| CN | 105245396 A | 1/2016 |
| CN | 106878031 A | 6/2017 |
| EP | 3116208 A1 | 1/2017 |

\* cited by examiner

TARIFF DATA DETERMINING METHOD AND APPARATUS FOR CREATING THE SAME

CROSS-REFERENCE TO RELATED APPLICATIONS

This application is a continuation of International Application No. PCT/CN2018/073850, filed on Jan. 23, 2018, which claims priority to Chinese Patent Application No. 201710173476.9, filed on Mar. 21, 2017, the disclosures of the aforementioned applications are hereby incorporated by reference in their entireties.

TECHNICAL FIELD

The present application relates to the communications field, and in particular, to a tariff data determining method and apparatus for creating the same.

BACKGROUND

When a user uses a service provided by a service provider, such as a mobile communications service, the service provider charges the user a corresponding fee by using a charging system. Conventional billing systems often cannot meet continuous development needs of operation services, the old charging system.

An upgrade process can be as follows: 1. Data structures in the old charging system are imported to the new charging system. 2. A call detail record (in the case of phone call records) generated by the new charging system is compared with a call detail record generated by the old charging system. 3. The data in the old charging system is updated, and if fee deductions of the new and old charging systems are consistent, the old charging system may be replaced with the new charging system without affecting the user experience. However, because data structures in the old charging system are often different from data structures in the new charging system, data in the old charging system may be lost in the process of importing the data in the old charging system to the new charging system. In this case, under the same charging condition, the fee deduction of the call detail record generated by the old charging system needs to be compared with the fee deduction of the call detail record generated by the new charging system, data verification is performed a plurality of times, and the data in the old charging system is continually modified. The old charging system can be replaced with the new charging system only when the fee deductions of the call detail records of the old charging system and the new charging system are consistent.

Therefore, correctness of tariff data, in the old charging system is very important. In a conventional manner, to obtain correct data in the old charging system, fee deductions of call detail records need to be compared each time, and a large quantity of call detail records need to be processed by a computer. The foregoing operations are performed for a plurality of times, and the correctness of tariff data in the old charging system is confirmed with operation personnel repeatedly. This process consumes a large quantity of computing resources and human resources, and thus the efficiency thereof is very low.

SUMMARY

Embodiments of the present application provide a tariff data determining method and apparatus. The tariff data determining method is applied to the tariff data determining apparatus. The tariff data determining method is used to analyze a large quantity of call detail records, and derive tariff data therefrom, thereby greatly reducing manual dependence, increasing efficiency of determining data in an old charging systems, and reducing computing resources and human resources.

According to a first aspect, an embodiment of the present application provides a tariff data determining method, including:

obtaining a call detail record set from a storage server, where the call detail record set may include preprocessed call detail records in a standard data format, each call detail record in the call detail record set includes a charging condition, a charging unit and a fee deduction that corresponds to the charging condition; grouping a plurality of call detail records in the call detail record set according to a preset rule, to obtain a call detail record group. For a value corresponding to the charging unit included in the call detail record and a fee value corresponding to the fee deduction, different tariff rates may be generated even for a tariff of a same service in a same package based on different charging elements included in the charging condition. Consequently, various tariff rates are mixed together in the call detail record set. For example, in a voice service, a plurality of fee values may appear for a same charging duration. For example, a call detail record A could be a Shenzhen-to-Shenzhen call detail record with a calling tariff, a call duration of 10 minutes, and a corresponding fee value is 0.5 yuan. A call detail record B could also be a Shenzhen-to-Shenzhen call detail record with a calling tariff, and a call duration of 10 minutes, but have a corresponding fee value of 1 yuan. In other words, in different call detail records, the same call duration may correspond to different fee values because, for example, a busy-hour tariff and an idle-hour tariff may be different, or a tariff of a familiarity number and a tariff of a normal number may be different. Therefore, the plurality of call detail records in the call detail record set are grouped to separate call detail records at different tariff rates. The obtained call detail record group needs to meet a grouping condition, and the grouping condition is that a same value corresponding to a charging unit in the call detail record group has a correspondence with a unique fee value corresponding to a fee deduction. After the call detail record group obtained after grouping meets the grouping condition, fee value data corresponding to the fee deduction in the call detail record group may be analyzed, to obtain a data feature. The data feature has a correspondence with a target tariff model. Then the target tariff model corresponding to the data feature may be selected from a preset tariff model based on the data feature. A tariff model is used to calculate the fee deduction based on the charging unit. Tariff data includes the tariff model, a tariff parameter corresponding to the tariff model, and the charging condition. After the target tariff model is determined, a parameter value corresponding to each tariff parameter in the target tariff model may be determined based on the value corresponding to the charging unit and the fee value corresponding to the fee deduction in the call detail record group. Finally the tariff data is determined based on the parameter value, the target tariff model, and the charging condition. In the prior art, call detail records in an old charging system are determined by continuously manually modifying the call detail records in the old charging system, to obtain tariff data in the old charging system. Instead, in this embodiment, data in the large quantity of call detail records in the old charging system are used to obtain the tariff data, thereby greatly reducing manual dependence, increasing efficiency of determining the data in the old charging system, and reducing computing resources and human resources.

In a possible implementation, the charging condition includes a plurality of charging elements, and a specific manner of grouping a plurality of call detail records in the call detail record set according to a preset rule, to obtain a call detail record group may be: grouping the plurality of call detail records in the call detail record set based on a preset charging element in the plurality of charging elements, to obtain the call detail record group, where the preset charging element may be preset according to experience and knowledge, and a same preset charging element in the call detail record group is corresponding to a same element value. For example, the preset charging element may be a service type, a service procedure, a caller home location, a calleecallee home location, a call type, or the like. According to an empirical value, if a same charging element, in the preset charging element, in each call detail record in the call detail record group is corresponding to a same element value, performing grouping based on the preset charging element may enable the call detail record group to meet the grouping condition, thereby increasing grouping efficiency, and increasing efficiency of processing subsequent steps.

In a possible implementation, when the same value corresponding to the charging unit has a correspondence with at least two fee values corresponding to the fee deduction, it may be understood that the call detail record group does not meet the grouping condition, and the call detail record group needs to be further grouped, until a call detail record obtained after grouping meets the grouping condition. A target charging element in the call detail record group is determined, the target charging element is a charging element other than the preset charging element in all charging elements included in the call detail record, and the target charging element corresponds to at least two different element values. For example, in a call detail record group, a charging element corresponding to "hour" includes two values "1" and "16". Then call detail records having the same target element value are grouped into one group, to obtain at least two target call detail record sub-groups, and call detail records having an element value "1" are grouped into one group to obtain two target call detail record sub-groups. When a same value corresponding to a charging unit in each target call detail record sub-group has a correspondence with a unique fee value corresponding to a fee deduction, a target charging element is used as a split point of the call detail record group. In other words, grouping can be performed based on the target charging element. In this way, the at least two target call detail record sub-groups obtained by performing further grouping on the call detail record group are the call detail record group, and the target element value is an element value corresponding to the target charging element. Optionally, a plurality of charging elements included in the call detail record may be sorted in advance, and a sorting rule is a degree of affecting a fee deduction. If the call detail record group does not meet the grouping condition, a target charging element is sequentially extracted from the plurality of charging elements, and the target charging element is used as a split point, to increase a probability of correctly extracting the split point.

In a possible implementation, similar call detail record groups are combined, and the similar call detail record groups herein are call detail record groups for which a preset quantity of charging elements in a plurality of charging elements may be different, but tariff rates are the same. The tariff rate being the same means that mapping relationships between values corresponding to a charging duration in the call detail record groups and fee values of fee deductions are the same. For example, in one call detail record group, a charging duration of 30 corresponds to a fee deduction of 20, and a charging duration of 40 corresponds to a deduction of 40. It is assumed that another call detail record group also includes a mapping relationship in which a charging duration of 30 corresponds to a fee deduction of 20 and a charging duration of 40 corresponds to a deduction of 40. Therefore, the two call detail record groups are combined. In this embodiment, call detail record groups having the same tariff rate may be combined, and then the combined call detail record groups may be processed. In this way, efficiency of processing subsequent steps can be increased.

In a possible implementation, an entropy of data in the call detail record group is calculated according to the following formula, where a parameter for the entropy is redefined, a mixture degree of tariff rates in the call detail record group is determined by calculating the entropy, the call detail record group may be a call detail record group obtained after initial grouping, or a call detail record group obtained by after the call detail record groups are combined:

$$\sum_i \sum_j \frac{|D_i|}{|D|}(-1)p_{ij}\log_2 p_{ij},$$

where D represents a quantity of call detail records in the call detail record group, Di represents a quantity of times that a charging unit i appears, and $p_{ij}$ represents a probability that a fee deduction j appears in the charging unit i. If the entropy is greater than a threshold, it is determined that two or more fee values of the fee deduction have a correspondence with the same value corresponding to the charging unit; or if the entropy is less than or equal to a threshold, it is determined that one fee value of the fee deduction has a correspondence with the same value corresponding to the charging unit.

In a possible implementation, when the target charging element includes a first charging element and a second charging element, a specific manner of grouping call detail records having a same target element value into one group, to obtain at least two target call detail record sub-groups includes: grouping call detail records having a same first element value into one group, to obtain at least two first call detail record sub-groups, where the first element value is an element value corresponding to the first charging element; and grouping call detail records having a same second element value into one group, to obtain at least two second call detail record sub-groups, where the second element value is an element value corresponding to the second charging element. Then further, a first information gain of the first call detail record sub-group relative to the call detail record group is calculated, and a second information gain of the second call detail record sub-group relative to the call detail record group is calculated. An information gain calculation can include subtracting, from an entropy of a call detail record group on which grouping is performed, an entropy of a call detail record sub-group obtained after grouping. A larger information gain indicates a smaller entropy of a call detail record sub-group obtained by performing grouping based on an added target charging element, and cases in which a same charging unit in the target call detail record sub-group corresponds to different fee deductions are reduced. A probability that the same charging unit in the call detail record group corresponds to different fee deductions may be verified through information gain calculation, and efficiency of verifying whether a charging element is a split point is increased. If the first information gain is greater than the second information gain, the second charging element is deleted from the plurality of charging elements. Deleting the second charging element (for example, a week) from the charging condition is deleting a redundant charging element. This can effectively reduce the amount of data processing because reducing one charging element eliminates one piece of data that needs to be processed. This can also effectively reduce a storage amount of the finally determined tariff data, and the tariff data is clearer because charging elements interfering with the tariff data are reduced.

In a possible implementation, each call detail record in the call detail record set carries a package identifier, the package identifier is used to indicate a tariff package to which the call detail record belongs, and further, tariff data with a same package identifier may be combined based on the package identifier carried in the call detail record, to obtain package tariff data. Tariffs corresponding to charging conditions in the same package are integrated. For example, tariff rates corresponding to a voice service, data service, a short message service message, and a multimedia message service in a package A are integrated in a tree-like structure, so that a user can make a convenient check and analysis.

In a possible implementation, the determined package tariff data or the determined tariff data is stored, and the tariff data is stored in the storage server, to support a new charging server in subsequent rating and a call detail record comparison server in comparing fee deductions of new and old call detail records.

In a possible implementation, when the data feature includes a quantity of pulse-based fee deduction values of the fee deduction, a pulse is used to indicate a minimum charging unit, a pulse-based fee deduction value is used to indicate a fee value corresponding to the pulse, and a specific implementation method for analyzing the call detail record group, to obtain a data feature may be: obtaining different fee values corresponding to the fee deduction in the call detail record group; sorting the different fee values; and determining a difference between two consecutive sorted fee values, where the difference is the pulse-based fee deduction value, where the quantity of different pulse-based fee deduction values may be determined based on a quantity of differences. In this embodiment, the quantity of pulse-based fee deduction values may be derived by using a large quantity of fee values corresponding to the fee deduction.

In a possible implementation, a specific implementation method for selecting, from a preset tariff model based on the data feature, a target tariff model corresponding to the data feature includes: selecting a first tariff model from the preset tariff model as the target tariff model if there is one pulse-based fee deduction value, where the first tariff model is a simple tariff model, a format of the first tariff model is:

$$y = unitFee^* \text{ceil}\left(\frac{x}{\text{pulse}}\right),$$

where y represents the fee deduction, x represents the charging duration, unitFee represents a pulse-based fee deduction value, pulse indicates a minimum charging duration unit, ceil represents a ceiling function, namely, rounding up, and there is one unitFee in the model; or selecting a second tariff model from the preset tariff model as the target tariff model if there are at least two pulse-based fee deduction values, where the second tariff model is a grade-based tariff model, and a format of the second tariff model is:

$$y = unitFee_1^* \text{Ceil}\left(\frac{x}{pulse_1}\right), x <= breakPoint1,$$

and when the charging duration exceeds a break point, the tariff model is:

$$y = unitFee1^* \text{Ceil}\left(\frac{breakPoint1}{pulse_1}\right) + unitFee_2^* \text{Ceil}\left(\frac{(x - breakPoint1)}{pulse_2}\right),$$

$x > breakPoint1,$ where
unitFee1 represents a pulse-based fee deduction value when the charging duration ranges from 0 to a breakpoint1, pulse, represents a pulse when the charging duration ranges from 0 to the breakpoint1 $unitFee_2$ represents a pulse-based fee deduction value when the charging duration is greater than the breakpoint1, and $pulse_2$ represents a pulse when the charging duration is greater than the breakpoint1, and the break point is a charging duration corresponding to a demarcation point of different pulse-based fee deduction values.

In a possible implementation, the charging unit includes a charging duration of a voice service, billed traffic of a data service, a quantity of billed short message services, and a quantity of billed multimedia messaging services.

According to a second aspect, an embodiment of the present application provides a tariff data determining apparatus, where the tariff data determining apparatus implements a function executed by an actual tariff data determining apparatus in the foregoing method. The function may be implemented by using hardware, or may be implemented by using hardware executing corresponding software. The hardware or software includes one or more modules corresponding to the foregoing function.

According to a third aspect, a structure of a tariff data determining apparatus includes a memory, a network interface, and a processor. The memory is configured to store computer executable program code, and is coupled to the network interface. The program code includes an instruction, and when the processor executes the instruction, the instruction enables the determining apparatus to execute information or an instruction used in the foregoing method.

According to a fourth aspect, an embodiment of the present application provides a computer-readable storage medium including an instruction, where when the instruction runs on a computer, the computer is enabled to perform the method in the first aspect.

According to a fifth aspect, an embodiment of the present application provides a computer program product including an instruction, where when the computer program product runs on a computer, the computer is enabled to perform the method in the first aspect.

DESCRIPTION OF EMBODIMENTS

Figure 1:
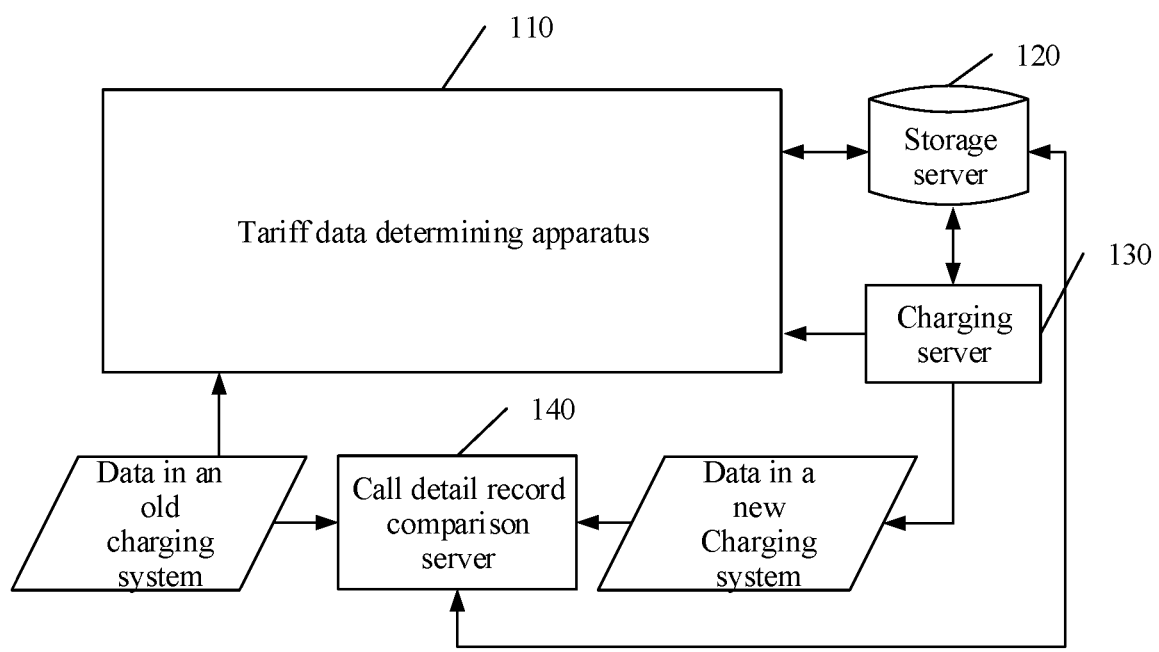
FIG. 1 is a schematic computer architectural diagram of a tariff data determining system according to an embodiment of the present application.

Embodiments of the present application provide a tariff data determining method and apparatus, to analyze a large quantity of call detail records, and reversely derive tariff data, thereby greatly reducing manual dependence, increasing efficiency of determining tariff data in an old charging system, and reducing computing resources and human resources.

In the specification, claims, and accompanying drawings of the present application, the terms "first", "second", "third", "fourth", and the like (if existent) are intended to distinguish between similar objects, but do not necessarily indicate a specific order or sequence. It should be understood that the data termed in such a way are interchangeable in proper circumstances, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed units, but may include other steps or units not expressly listed or inherent to such a process, method, system, product, or device.

For ease of understanding, terms used in the embodiments of the present application are first explained.

Data in an old charging system is data stored in the old charging system, including user data, system data, and call detail record data.

The user data includes data such as a package ordered by a user, capitals in a user account, a phone number of the user, and a zone to which the user belongs.

The system data includes number analysis data, tax rate information, authentication data, and the like. The number analysis data is used to support a new system in analyzing related information, such as a home location of the user, a visited location, and whether the user roams, based on a calling number of the user or a home location register (Home Location Register, HLR) number. The tax rate information is used to support taxing a user consumption service, for example, deducting a fee for all voice calls, or raising taxes by 10%.

A call detail record is original communication record information, and may also be referred to as a detail record or a call detail record (Call Detail Record, CDR). Based on different services, the call detail record further can include a call detail record of a short message service, a call detail record of a multimedia messaging service, a call detail record of a voice service, a call detail record of a network service, and the like. For example, when a voice service is used, two call detail records may be generated each time a user makes a call, such as a call detail record of a caller user and a call detail record of a calleecallee user. In a charging system, one user may correspond to a plurality of call detail records.

The call detail record mainly records the following information:

a charging condition and a charging rate, which may also be understood as a charging rate of the call detail record under a charging condition, where the charging condition further includes a plurality of charging elements.

The charging elements include a package ID, a service type (including a voice, a short message service message, a multimedia message, or traffic), a service procedure (calling/called/forwarding), a caller/callee home location, a visited location of a caller/callee, an operator to which the caller/callee belongs, a caller/callee number, an abbreviated number of a familiarity number of the caller/callee, a number of a caller/callee group account, an account balance of the caller/callee, a charging duration of the caller/callee, a call duration of the caller/callee, a deduction of the caller/callee, tax rate information of charging time (including information extracted from the charging time, such as a week in which charging is performed, an hour in which charging is performed, or a minute in which charging is performed) of the caller/callee, traffic consumed by the caller, a quantity of short message service messages sent by the caller, and the like.

The charging rate is used to indicate a fee deduction corresponding to a charging unit. The charging unit includes a charging duration of a voice service, billed traffic of a network service, a quantity of billed short message services, a quantity of billed multimedia messaging services, and the like.

Referring to the following Table 1, an example of the call detail record data structure is described below by using a call detail record of a voice service as an example.

TABLE 1

| | | Charging condition | | | | Charging rate | |
| --- | --- | --- | --- | --- | --- | --- | --- |
| Call detail record | Service type | Service procedure | Caller home location | Callee home location | Call type | Charging duration (x) | Fee deduction (y) |
| 1 | Voice | Calling | Shenzhen | America | International toll call | 30 | 150 |
| 2 | Voice | Called | Shenzhen | Beijing | National toll call | 30 | 0 |

TABLE 1-continued

|  |  |  | Charging condition | | | Charging rate | |
| --- | --- | --- | --- | --- | --- | --- | --- |
| Call detail record | Service type | Service procedure | Caller home location | Callee home location | Call type | Charging duration (x) | Fee deduction (y) |
| 3 | Voice | Calling | Shenzhen | Shenzhen | Local | 5 | 20 |
| 4 | Voice | Calling | Shenzhen | Beijing | Local | 10 | 20 |

It should be noted that, in Table 1, a unit of the charging duration may be "seconds", and a unit of the fee deduction may be "cents".

Referring to the following Table 2, an example of the call detail record data structure is described below by using a call detail record of a short message service as an example.

TABLE 2

|  |  |  | Charging condition | | | Charging rate | |
| --- | --- | --- | --- | --- | --- | --- | --- |
| Call detail record | Service type | Service procedure | Caller home location | Callee home location | Roam | Charging quantity (x) | Fee deduction (y) |
| 1 | Short message service message | Calling | Shenzhen | Honkong | Yes | 1 | 100 |
| 2 | Short message service message | Called | Shenzhen | Beijing | No | 5 | 0 |
| 3 | Short message service message | Calling | Shenzhen | Shenzhen | No | 5 | 50 |

In Table 2, a unit of the charging quantity may be "pieces", and a unit of the fee deduction may be "cents".

Referring to the following Table 3, an example of the call detail record data structure is described below by using a call detail record of a data service as an example.

TABLE 3

|  |  |  | Charging condition | | | Charging rate | |
| --- | --- | --- | --- | --- | --- | --- | --- |
| Call detail record | Service type | Service procedure | Caller home location | Callee home location | Intra-provincial | Billed traffic (x) | Fee deduction (y) |
| 1 | Data service | Calling | Shenzhen | Guangzhou | Yes | 1 | 5 |
| 2 | Data service | Calling | Shenzhen | Beijing | No | 1 | 10 |

In Table 3, a unit of the fee deduction may be "cents", and a unit of the billed traffic may be "mega".

It should be noted that the call detail records in Table 1 to Table 3 are merely examples, and do not impose limitations on this application. In this embodiment of the present application, the voice service is used as an example for description, and the charging unit is described by using the charging duration as an example.

A call detail record group can be a call detail record obtained after tens of thousands or hundreds of millions of call detail records in the old charging system are grouped. The call detail record group further includes a plurality of call detail records. It should be noted that the "call detail record group" and a "call detail record sub-group" are used in this embodiment of the present application, and the "call detail record sub-group" is also a form of the call detail record group. In this embodiment of the present application, a plurality of call detail records are grouped. Grouping twice is used as an example. A call detail record obtained after initial grouping is referred to as a "call detail record group". Based on the initial grouping, a call detail record obtained after grouping is performed on a call detail record group is referred to as a "call detail record sub-group". In an example, the "call detail record group" and the "call detail record sub-group" are distinguished only for ease of description. Grouping may be performed a plurality of times in this embodiment of the present application, and the "call detail record group" or the "call detail record sub-group" may be understood as a call detail record obtained after grouping any appropriate number of times. It may be understood that the call detail record group may include the call detail record sub-group.

Tariff data includes the charging condition and the charging rate, and is used to record a charging rate under a charging condition.

In this embodiment of the present application, the old charging system stores a large quantity of call detail records of various user services in Table 1 to Table 3, the large quantity of call detail records in the old charging system may be analyzed in this embodiment of the present application, to derive package tariff data, to reduce the need for computing resources and human resources because correctness of tariff data in the old charging system needs to be repeatedly determined many times in a conventional method.

An embodiment of the present application provides a tariff data determining method. The determining method is applied to a tariff data determining system. FIG. 1 is a schematic architectural diagram of a tariff data determining system. The system includes a tariff data determining apparatus 110, a storage server 120, a charging server 130, and a call detail record comparison server 140. The tariff data determining apparatus 110 may exist in a form of a server.

The tariff data determining apparatus 110 is configured to: obtain data in an old charging system, where the data in the old charging system includes a large quantity of call detail record data; and reversely derive tariff data or even package tariff data based on the large quantity of call detail record data.

The storage server 120 is configured to store the call detail record data and the tariff data in this embodiment of the present application. For example, the storage server may be an Oracle database or a Hadoop distributed file system (Hadoop Distributed File System, HDFS).

The charging server 130, as a tariff data collection point, is configured to: generate a call detail record for usage of service, and deduct, based on a tariff data, a fee for services provided by an operator.

The call detail record comparison server 140 is configured to: compare a fee deduction of a new charging system and a fee deduction of an old charging system under a same charging conditions, and determine, through such comparison performed by the call detail record comparison server, whether the fee deduction of the new charging system and the fee deduction of the old charging system are consistent. According to the tariff data determining method provided in this embodiment of the present application, the fee deduction of the new charging system and the fee deduction of the old charging system under the same charging conditions are basically consistent.

The tariff data determining method in this embodiment of the present application is performed by the tariff data determining apparatus 110. The determining apparatus 110 obtains a call detail record set from the storage server 120, the call detail record set includes a large quantity of call detail records, and tens of thousands of or even hundreds of millions of call detail records in the call detail record set are used to obtain the tariff data. Specifically, the plurality of call detail records in the call detail record set are grouped according to a preset rule, to obtain a call detail record group, and the call detail record group is enabled to meet a grouping condition. The grouping condition is that a same value corresponding to a charging unit in the call detail record group has a correspondence with a unique fee value corresponding to a fee deduction.

It may be understood that a reason for grouping the call detail records in the call detail record set is that each of the large quantity of call detail records includes a charging unit and a fee deduction corresponding to the charging unit. For example, a call detail record A is a Shenzhen-to-Shenzhen call detail record with a calling tariff, a call duration of 10 minutes, and a corresponding fee deduction of 0.5 yuan; a call detail record B is also a Shenzhen-to-Shenzhen call detail record with a calling tariff, a call duration of 10 minutes, but a corresponding fee deduction of 1 yuan. In other words, in different call detail records, the same call duration may be corresponding to different fee deductions because a busy-hour tariff and an idle-hour tariff may be different, or a tariff of a familiarity number and a tariff of a normal number may be different. Therefore, in this embodiment of the present application, the large quantity of call detail records in the call detail record set need to be grouped, so that the same value corresponding to the charging unit in the call detail record group obtained after grouping has a correspondence with the unique fee value corresponding to the fee deduction. For example, a call detail record group A and a call detail record group B are obtained after grouping, the call detail record group A includes a call detail record A, and the call detail record group B includes a call detail record B. The call detail record group A includes four call detail records. In the four call detail records, a call duration 10 minutes corresponds to a fee deduction 0.5 yuan, and the call duration of 10 minutes does not correspond to another fee value of a fee deduction. In a grouping process, the call detail record A and the call detail record B are grouped into different groups according to the preset rule. In this way, because tariff rates in each call detail record group obtained after grouping are no longer mixed, a fee value corresponding to a fee deduction in the call detail record group may be analyzed, to obtain a data feature of the call detail record group. The data feature is used to select, from a preset tariff model, a target tariff model corresponding to the data feature. A tariff model is used to calculate the fee deduction based on the charging unit. Then a parameter value corresponding to each tariff parameter in the target tariff model is determined based on the data feature. Finally the tariff data may be determined based on the parameter value, the target tariff model, and the charging condition.

In the prior art, call detail records in the old charging system are determined by continuously manually modifying the call detail records in the old charging system, to obtain tariff data in the old charging system. Instead, in this embodiment, data in the large quantity of call detail records in the old charging system are used to obtain the tariff data, thereby greatly reducing manual dependence, increasing efficiency of determining the data in the old charging system, and reducing computing resources and human resources.

Figure 2:
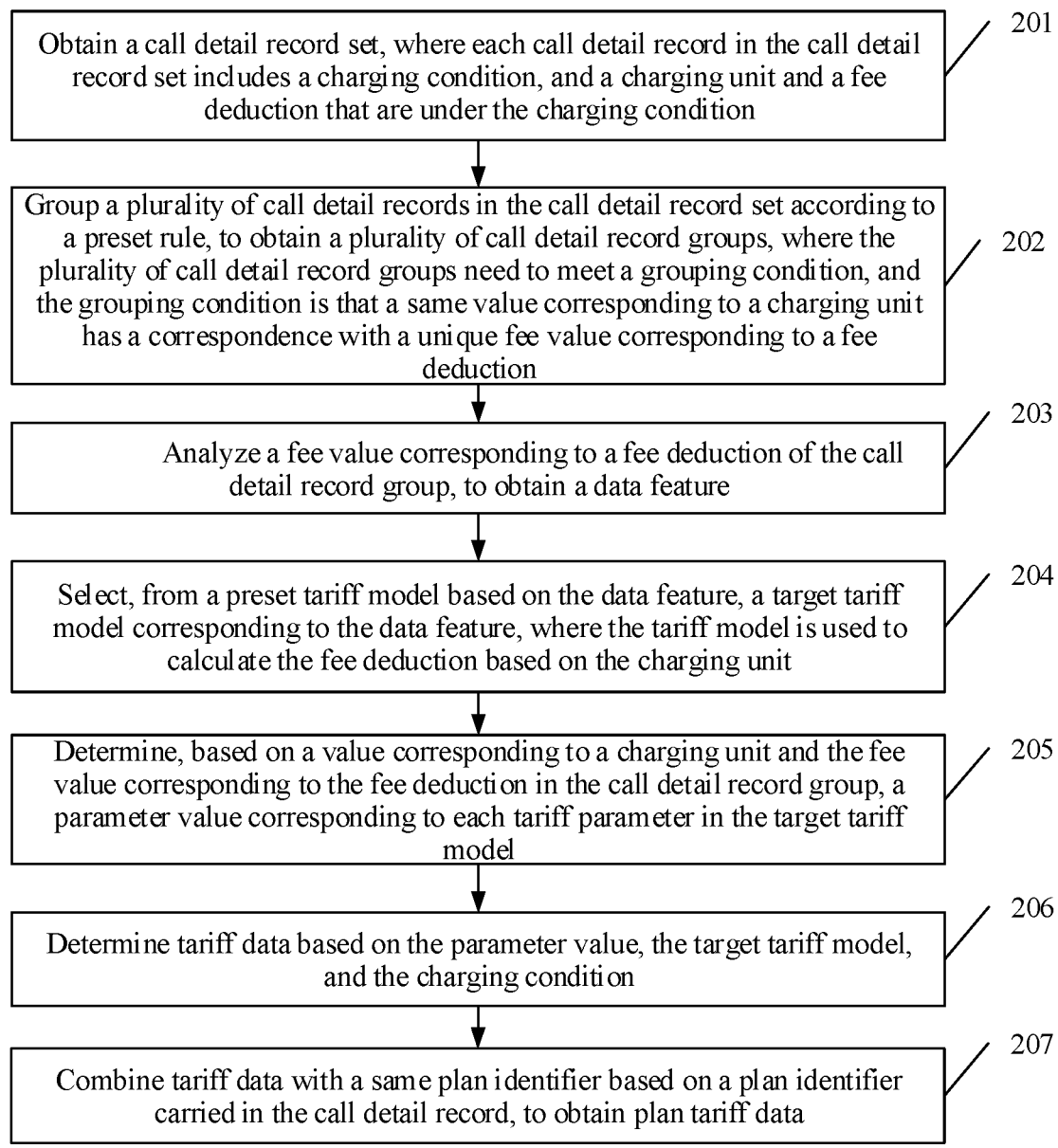
FIG. 2 is a flowchart of steps of a tariff data determining method according to the embodiments of the present application.

Referring to FIG. 2, a tariff data determining method provided in an embodiment of the present application is described below in detail from a tariff data determining apparatus side. An embodiment of the tariff data determining method provided in the embodiments of the present application includes the following steps.

Step 201: Obtain a call detail record set, where each call detail record in the call detail record set includes a charging condition, and a charging unit and a fee deduction that are under the charging condition.

Figure 3:
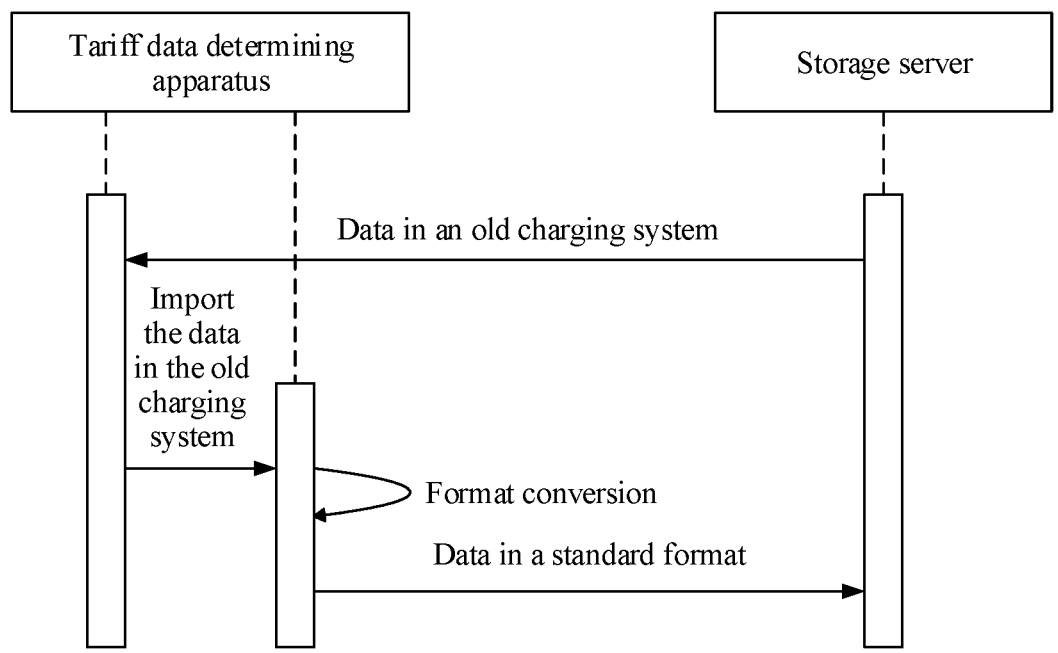
FIG. 3 is a schematic diagram of preprocessing steps according to an embodiment of the present application.

The call detail record set in this embodiment may include preprocessed call detail records in a standard data format. FIG. 3 is a schematic diagram of preprocessing steps according to this embodiment of the present application.

Different old charging systems have different data structures, and a data structure of a new system is different from a data structure of an old charging system. Therefore, a standard data structure is provided to adapt to such a change, data existing in the old system is converted into data in the standard data structure, and the converted data in the standard format is imported to a storage server, so that the data is used for deriving tariff data.

The preprocessing steps are mainly performed to convert a data format. Specific steps include: 1. obtaining data (including user data, system data, and call detail record data) in the old charging system; 2. converting the obtained data in the old charging system into data in the standard format; 3. storing, in the storage server, the data in the standard format.

It should be noted that, after conversion of the format of the data in the old system is completed in a preprocessing process, the data in the standard format is stored in a storage system, to perform a tariff data determining step. If the data in the old charging system was already in the standard format, or the data in the old charging system is of the same format as data in a new charging system, the preprocessing steps need not be performed.

The call detail record set is obtained from the storage server, and the call detail record set may include call detail records in the standard data format in the storage server. The call detail record set can include a large quantity of call detail records, and each call detail record may be one of the call detail records shown in Table 1 to Table 3.

Step 202: Group a plurality of call detail records in the call detail record set according to a preset rule, to obtain a plurality of call detail record groups, where the plurality of call detail record groups need to meet a grouping condition, and the grouping condition is that a same value corresponding to a charging unit has a correspondence with a unique fee value corresponding to a fee deduction.

If the call detail record group meets the grouping condition, step 203 is performed; or if the call detail record group does not meet the grouping condition, grouping is further performed on the call detail record group, until call detail record sub-groups obtained after grouping is performed on the call detail record group meet the grouping condition.

Figure 4:
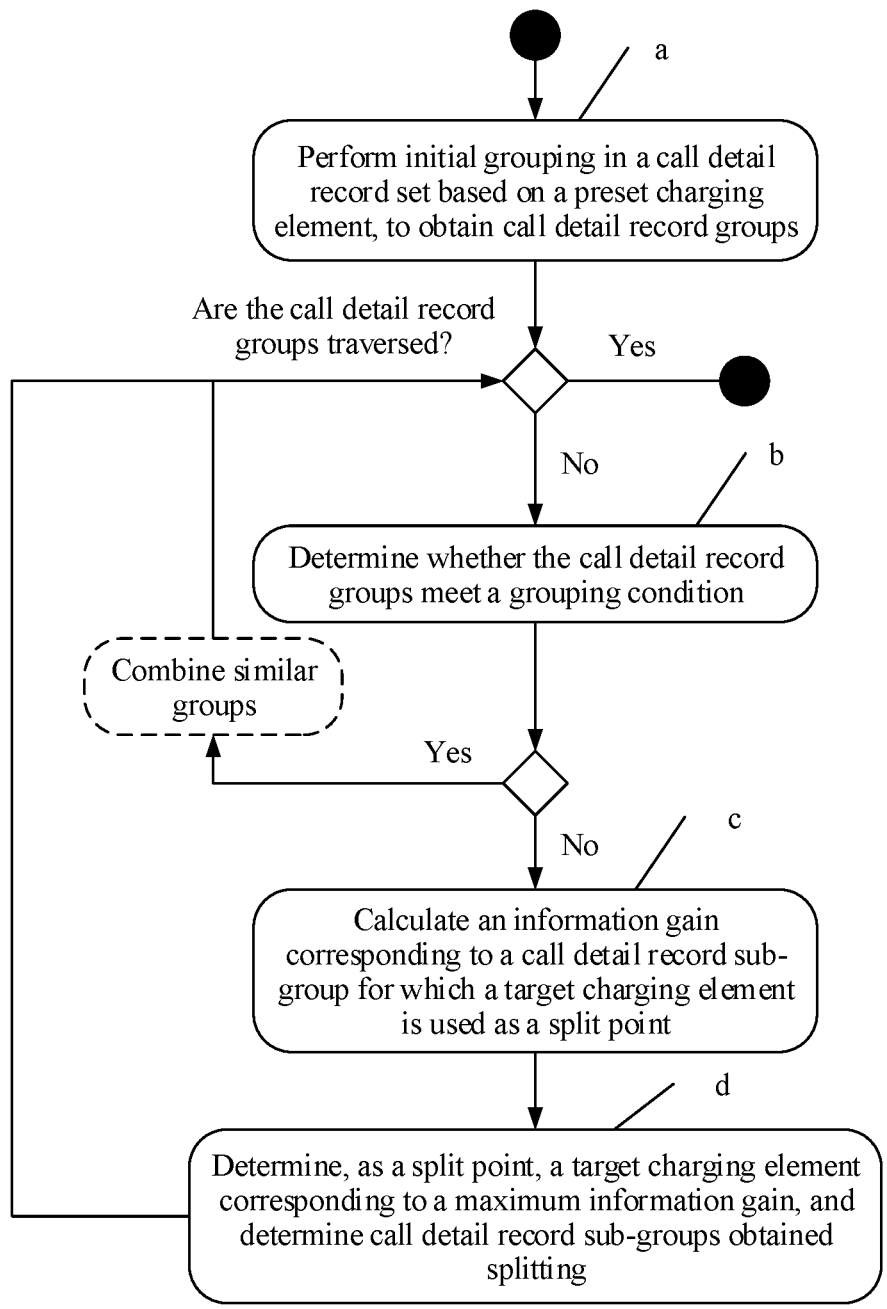
FIG. 4 is a schematic flowchart of grouping a plurality of call detail records in a call detail record set according to an embodiment of the present application.

FIG. 4 is a schematic flowchart of grouping the plurality of call detail records in the call detail record set according to this embodiment of the present application.

It should be noted that, for data included in a call detail record, different tariff rates may be generated even for a tariff of a same service in a same package based on different charging elements included in a charging condition. Consequently, various tariff rates are mixed together in a call detail record set. For example, in a voice service, a plurality of fee deductions may appear for the same charging duration. For example, a user performs a voice service (makes a call for 10 minutes) in a time period from 7 a.m. to 10 a.m., and a fee deduction is 3 yuan; however, the user performs a voice service (makes a call for 10 minutes) in a time period from 10 p.m. to 12 p.m., but a fee deduction is 1 yuan. The plurality of call detail records in the call detail record set are grouped to separate call detail records at different tariff rates.

Specific steps of grouping the plurality of call detail records in the call detail record set according to a preset rule may be as follows:

Step a: Perform initial grouping, in other words, group the plurality of call detail records in the call detail record set based on a preset charging element in a plurality of charging elements, to obtain a plurality of call detail record groups, where a same preset charging element for each of the plurality of call detail record groups is corresponding to a same element value.

The preset charging element is preset according to experience and knowledge. A voice service is used as an example for description. It is assumed that initial grouping conditions for a package are a service type, a service procedure, a caller home location, a callee home location, and a call type. Three call detail record groups are obtained based on the preset charging element: a Shenzhen-to-Shenzhen call detail record group with a calling tariff of a local voice, a Shenzhen-to-Beijing call detail record group with a calling tariff of an inter-provincial (national) toll call voice, and a Shenzhen-to-America call detail record group with a calling tariff of an international toll call voice. One of the three call detail record groups, namely, the Shenzhen-to-Shenzhen call detail record group with the calling tariff, is used as an example below for description. The call detail record group data structure is shown in the following Table 4.

TABLE 4

| Service type | Service procedure | Caller home location | Callee home location | Call type | Charging duration (x) | Fee deduction (y) |
|---|---|---|---|---|---|---|
| Voice | Calling | Shenzhen | Shenzhen | Local | 30 | 30 |
| Voice | Calling | Shenzhen | Shenzhen | Local | 10 | 10 |
| Voice | Calling | Shenzhen | Shenzhen | Local | 40 | 40 |
| Voice | Calling | Shenzhen | Shenzhen | Local | 20 | 20 |

It should be noted that a quantity (for example, three) of call detail record groups obtained by grouping the plurality of call detail records in the call detail record set, the values corresponding to the charging duration and the fee values corresponding to the fee deduction in the call detail record group illustrated in Table 4, and a plurality of charging elements in Table 4 are all examples used for ease of description, and do not impose limitation on this application.

Step b: Determine whether the call detail record group meets a grouping condition that a same value corresponding to a charging unit in the call detail record group has a correspondence with a unique fee value corresponding to a fee deduction.

It should be noted that a plurality of call detail record groups need to be traversed, and each of the plurality of call detail record groups needs to be verified, to determine whether each call detail record group meets the grouping condition. For example, for ease of description, one call detail record group may be used as an example for description in this embodiment.

The call detail record group in Table 4 is used as an example. The call detail record group in Table 4 includes four call detail records, and all preset charging elements in the four call detail records are corresponding to a same element value. In other words, all the four call detail records are Shenzhen-to-Shenzhen call detail records with a calling voice tariff.

In the example in Table 4, in the first call detail record in the call detail record group, the fee deduction corresponding to the charging duration 30 is 30; in the second call detail record, the fee deduction corresponding to the charging duration 10 is 10; in the third call detail record, a fee deduction corresponding to the charging duration 40 is 40; and in the fourth call detail record, the fee deduction corresponding to the charging duration 20 is 20. There is only one correspondence between the charging duration and the fee deduction. In other words, the call detail record group in Table 4 meets the condition that the same value corresponding to the charging unit in the call detail record group corresponds with the unique fee value corresponding to the fee deduction.

Another example of a call detail record group data structure is provided below.

TABLE 5

| Service type | Service procedure | Caller home location | Callee home location | Call type | Charging duration (x) | Fee deduction (y) |
|---|---|---|---|---|---|---|
| Voice | Calling | Shenzhen | Shenzhen | Local | 30 | 20 |
| Voice | Calling | Shenzhen | Shenzhen | Local | 30 | 10 |
| Voice | Calling | Shenzhen | Shenzhen | Local | 40 | 40 |
| Voice | Calling | Shenzhen | Shenzhen | Local | 40 | 20 |

It may be learned from the example of the call detail record group in Table 5 that, in the four call detail records in the call detail record group in Table 5, the charging duration 30 corresponds to the two values of the fee deduction that are 20 and 10, and the charging duration 40 corresponds to the fee values of the fee deduction that are 40 and 20. In other words, in the example of the call detail record group in Table 5, the call detail record group does not meet the condition that a same value corresponding to a charging unit in the call detail record group corresponds with a unique fee value corresponding to a fee deduction.

Examples of the conditions that need to be met by the call detail record groups obtained through grouping are provided above, and how to verify whether the call detail record groups meet the condition that the same value corresponding to the charging unit corresponds with the unique fee value corresponding to the fee deduction is described below.

First, an entropy of data in the call detail record group is calculated according to the following formula 1:

$$\sum_i \sum_j \frac{|D_i|}{|D|}(-1)p_{ij}\log_2 p_{ij},$$

where

D represents a quantity of call detail records in the call detail record group, Di represents a quantity of times that a charging unit i appears, and $P_{ij}$ represents a probability that a fee deduction i appears in the charging unit j.

The entropy may be used to verify a mixture degree that the same charging duration (x) in a call detail record group obtained after grouping corresponds to different deductions (y), and grouping is performed to enable the entropy to be or close to 0. In this way, the same value corresponding to the charging duration in the call detail record group corresponds only to one value of a fee deduction. For example, in the example in Table 4, the charging duration 30 in the call detail record group corresponds only to one value (for example, 30) of the fee deduction.

For example, referring to formula 1, a calculation process of the call detail record group in Table 5 is used as an example for description.

There are two different charging durations in the call detail record group, and an entropy calculation process and a corresponding calculation result are as follows:

$$2/4(-½\log_2 ½-½\log_2 ½)+2/4(-½\log_2 ½-½\log_2 ½)=1$$

where a calculation process of the formula is divided into two parts, $2/4(-½\log_2 ½-½\log_2 ½)$ represents an entropy generated for the call detail record group by a call detail record having a charging duration of 30, and $2/4(-½\log_2 ½-½\log_2 ½)$ represents an entropy generated for the call detail record group by a call detail record having a charging duration of 40.

It is assumed that $2/4(-½\log_2 ½-½\log_2 ½)$ corresponds to the charging duration of 30, where 2/4 represents a ratio of a quantity of call detail records having a charging duration of 30 to a total quantity of call detail records, the numerator represents two call detail records having the charging duration of 30, the denominator 4 represents four call detail record groups in total. ½ in the first $(-½\log_2 ½)$ in $(-½\log_2 ½-½\log_2 ½)$ represents a ratio of a quantity of call detail records having a charging duration (x) of 30 and a fee deduction (y) of 20 to a quantity of call detail records having a charging duration of 30, and ½ in the second $(-½\log_2 ½)$ represents a ratio of a quantity of call detail records having a charging duration (x) of 30 and a fee deduction (y) of 10 to a quantity of call detail records having a charging duration of 30.

If the entropy is greater than a threshold, two or more fee values of the fee deduction have a correspondence with the same value corresponding to the charging duration. There is at least one "same value".

For example, in the call detail record group, the charging duration includes 1, 5, 10, and 15. The charging duration 1 is corresponding to fee deductions 1 and 2, the charging duration 5 is corresponding to fee deductions 5 and 6, and the charging duration 10 is corresponding to fee deductions 10 and 11. In other words, three values corresponding to the charging duration in the call detail record group do not meet the grouping condition. It may also be understood that when the entropy is greater than the threshold, at least one value corresponding to the charging duration does not meet the grouping condition in actual application.

If the entropy is less than or equal to a threshold, one fee value of the fee deduction has a correspondence with the same value corresponding to the charging duration. In actual application, when an error or a failure is considered, for example, the threshold is set to be greater than and close to 0 (for example, 0.001), and when the entropy is less than or equal to 0.001, two or more fee values of the fee deduction may have a correspondence with the same value. Such a case is possible in actual application. Such a setting is more suitable for the actual application. For example, in a call detail record group, a charging duration includes 1, 5, 10, and 15. The charging duration 1 is corresponding to a fee deduction 1, the charging duration 5 is corresponding to a fee deduction 5, the charging duration 15 is corresponding to a fee deduction 15, but the charging duration 10 is corresponding to fee deductions 10 and 12. In other words, one value 10 included in the plurality of values of the charging duration corresponds to two fee values. Such a case is within a permissible error range. Only four values are used as an example herein for description. In actual application, there may be tens of thousands of such values. In other words, in the large quantity of values of the charging duration, a minute quantity of values may be allowed to have a correspondence with two or more fee values of the fee deduction.

It should be noted that the values corresponding to the charging duration and the fee values corresponding to the fee deduction are all an example for description, and do not impose limitations on this application.

If the threshold is 0.001, the entropy of the call detail record group in Table 5 is calculated. If the entropy 1 of the call detail record group is greater than the threshold, it indicates at least two correspondences between the same value corresponding to the charging duration and the fee values of the fee deduction in the call detail record group. As shown in Table 5, the charging duration 30 corresponds to both the fee deduction 20 and the fee deduction 10.

A process of calculating an entropy of the call detail record group in Table 4 is not described herein again.

If the entropy of the call detail record group in Table 4 is 0, it indicates that the call detail record group in Table 4 meets the condition that the same value corresponding to the charging unit has a correspondence with the unique fee value corresponding to the fee deduction. Therefore, grouping does not need to be continued, and step 303 may be directly performed.

If the call detail record group is the example shown in Table 5, it indicates that the call detail record group does not meet the condition that the same value corresponding to the charging unit has a correspondence with the unique fee value corresponding to the fee deduction. Therefore, grouping needs to be performed on the call detail record group, until the condition is met that the same value corresponding to the charging unit corresponds with the unique fee value corresponding to the fee deduction.

It may be understood that, in this embodiment of the present application, a process of grouping the plurality of call detail records in the call detail record set may include: grouping the plurality of call detail records based on the preset charging element, to obtain the call detail record group; and then calculating the entropy of the call detail record group to verify whether the call detail record group meets the grouping condition. There are two results of verifying the call detail record group. A first result is that the call detail record group meets the grouping condition. Therefore, grouping does not need to be continued, and step 303 may be directly performed. A second result is that the call detail record group does not meet the grouping condition. It indicates that a plurality of tariff rates are mixed in the call detail record group. Grouping needs to be performed on the call detail record group to obtain call detail record subgroups.

In this embodiment, call detail records in the call detail record set are grouped twice. First grouping is the initial grouping, and second grouping is performed on the call detail record group, to obtain the call detail record subgroup. It should be understood that, in this embodiment, grouping twice is only used as an example for description. However, in actual application, a quantity of times of grouping the plurality of call detail records in the call detail record set is not limited. The grouping condition may be met after the first grouping, and grouping does not need to be performed subsequently. Alternatively, if a call detail record obtained after the second grouping still does not meet the grouping condition, grouping needs to be performed for a third time and a fourth time, until a call detail record obtained after grouping meets the grouping condition. Regardless of how many times grouping is performed, a grouping principle is the same as a principle of the second grouping. For a specific subsequent grouping process, refer to a process of performing grouping on the call detail record group in this embodiment for understanding.

In this embodiment of the present application, a call detail record group is used as an example for description. However, in actual application, every call detail record group may be checked whether it meets the grouping condition.

Optionally, similar call detail record groups may be further combined, and the similar call detail record groups herein are call detail record groups for which a preset quantity of charging elements in a plurality of charging elements may be different but tariff rates are the same. For example, in the example of the call detail record group corresponding to Table 4, the values corresponding to the charging duration in the call detail record group obtained after grouping and the fee values corresponding to the fee deduction are obtained, and a mapping relationship (for example, in the call detail record group corresponding to Table 4, the charging duration 30 corresponds to the fee deduction 20, and the charging duration 40 corresponds to the charge 40) between the values corresponding to the charging duration and the fee values corresponding to the fee deduction is stored. It is assumed that a mapping relationship between a charging duration and a fee deduction in another call detail record group C is the same as that in the call detail record group corresponding to Table 4. In other words, the mapping relationship that the charging duration 30 corresponds to the fee deduction 20 and the charging duration 40 corresponds to the fee deduction 40 is also included. This indicates that the call detail record group corresponding to Table 4 and the call detail record group C use one tariff rate. Therefore, the call detail record group corresponding to Table 4 and the call detail record group C are combined. In this embodiment, call detail record groups at a same tariff rate may be combined, and then a call detail record group obtained after combination may be processed, so that efficiency of processing subsequent steps can be increased.

Further, a call detail record group obtained after combination (for example, the call detail record group obtained after the call detail record group corresponding to Table 4 and the call detail record group C are combined) is verified. In other words, step b is performed repeatedly on the call detail record group obtained after the call detail record group corresponding to Table 4 and the call detail record group C are combined, an entropy of the call detail record group obtained after combination is calculated, and whether the call detail record group obtained after combination meets the grouping condition is determined. If the call detail record group obtained after combination meets the grouping condition, performing step 303 is continued; or if the call detail record group obtained after combination does not meet the grouping condition, step c is performed.

Step c: If the call detail record group does not meet the grouping condition, determine a target charging element in the call detail record group, and determine an information gain corresponding to a call detail record sub-group for which the target charging element is used as a split point, where the target charging element corresponds to at least two different element values. Call detail records having a same target element value are grouped into one group, to obtain at least two target call detail record sub-groups.

It should be noted that the call detail record group in this step may be the call detail record group obtained after initial grouping, or the call detail record group obtained after combination.

Further, the call detail record group in Table 5 is used as an example below, to describe a step of continuously performing grouping on the call detail record group in Table 5 to obtain call detail record sub-groups.

When a same value corresponding to a charging unit in each target call detail record sub-group has a correspondence with a unique fee value corresponding to a fee deduction, the at least two target call detail record subgroups are the call detail record group, and the target element value is an element value corresponding to the target charging element.

The target charging element may be one charging element or may include at least two charging elements. An example in which the target charging element is one charging element and an example in which the target charging element includes at least two charging elements are separately used below for description.

In a possible implementation, the example in which the target charging element is one charging element is used for description.

For example, referring to Table 6, it is assumed herein that an hour to which a calling charging time belongs is extracted from a plurality of charging elements as the target charging element, and the target charging element may also be understood as a split point.

TABLE 6

| Service type | Service procedure | Caller home location | Callee home location | National toll call | Hour | Charging duration (x) | Fee deduction (y) |
|---|---|---|---|---|---|---|---|
| Voice | Calling | Shenzhen | Shenzhen | No | 16 | 30 | 20 |
| Voice | Calling | Shenzhen | Shenzhen | No | 1 | 30 | 10 |
| Voice | Calling | Shenzhen | Shenzhen | No | 16 | 40 | 40 |
| Voice | Calling | Shenzhen | Shenzhen | No | 1 | 40 | 20 |

As shown in Table 7 and Table 8, grouping is performed on the call detail record group shown in Table 6, the call detail records for which the target charging element "hour" corresponds to "1" are grouped into one group, and the call detail records for which the target charging element "hour" corresponds to "16" are grouped into one group, to obtain the following two target call detail record sub-groups.

TABLE 7

| Service type | Service procedure | Caller home location | Callee home location | National toll call | Hour | Charging duration (x) | Fee deduction (y) |
|---|---|---|---|---|---|---|---|
| Voice | Calling | Shenzhen | Shenzhen | No | 16 | 30 | 20 |
| Voice | Calling | Shenzhen | Shenzhen | No | 16 | 40 | 40 |

It should be noted that, in the examples of the call detail records for which a voice service is used as an example in this embodiment of the present application, when no unit is given, a unit of a charging duration may be "seconds", and a unit of a fee deduction may be "cents".

TABLE 8

| Service type | Service procedure | Caller home location | Callee home location | National toll call | Hour | Charging duration (x) | Fee deduction (y) |
|---|---|---|---|---|---|---|---|
| Voice | Calling | Shenzhen | Shenzhen | No | 1 | 30 | 10 |
| Voice | Calling | Shenzhen | Shenzhen | No | 1 | 40 | 20 |

Then entropies of the target call detail record sub-groups shown in Table 7 and Table 8 are calculated according to the formula 1, to determine whether the target call detail record sub-group meets the grouping condition. If the target call detail record sub-group meets the grouping condition, grouping does not need to be continued; or if the target call detail record sub-group does not meet the grouping condition, another charging element in the plurality of charging elements needs to be extracted as a split point (for example, a week charging element to which a time point belongs), to continuously perform grouping on the target call detail record sub-group, until the grouping condition is met.

It should be noted that the target call detail record sub-groups shown in Table 7 and Table 8 meet the grouping condition. Therefore, grouping does not need to be continued again.

In another possible implementation, an example in which the target charging element includes at least two charging elements is used for description. When the target charging element includes a first charging element and a second charging element, call detail records having the same first element value are grouped into one group, to obtain at least two first call detail record sub-groups, and the first element value is an element value corresponding to the first charging element; and call detail records having the same second element value are grouped into one group, to obtain at least two second call detail record sub-groups, and the second element value is an element value corresponding to the second charging element. Table 9 shows description of the example in which the target charging element includes two charging elements. The first charging element may use an example of an "hour", and the second charging element may use an example of a "week".

TABLE 9

| Service type | Service procedure | Caller home location | Callee home location | National toll call | Hour | Week | Charging duration (x) | Fee deduction (y) |
|---|---|---|---|---|---|---|---|---|
| Voice | Calling | Shenzhen | Shenzhen | No | 16 | One | 30 | 20 |
| Voice | Calling | Shenzhen | Shenzhen | No | 1 | One | 30 | 10 |

TABLE 9-continued

| Service type | Service procedure | Caller home location | Callee home location | National toll call | Hour | Week | Charging duration (x) | Fee deduction (y) |
|---|---|---|---|---|---|---|---|---|
| Voice | Calling | Shenzhen | Shenzhen | No | 16 | Two | 40 | 40 |
| Voice | Calling | Shenzhen | Shenzhen | No | 1 | Two | 40 | 20 |

Step d: When the target charging element includes the at least two charging elements, determine, as a split point, a target charging element corresponding to a maximum information gain, and determine call detail record sub-groups obtained after the call detail record group is split.

A first information gain of a first call detail record sub-group relative to the call detail record group is calculated, and a second information gain of a second call detail record sub-group relative to the call detail record group is calculated. If the first information gain is greater than the second information gain, the second charging element is deleted from the plurality of charging elements.

For example, in Table 9, the "hour" is used as the split point to further perform grouping, and the first call detail record sub-groups are shown in Table 10 and Table 11.

and the entropies of the first call detail record sub-groups are 0. First information gains of the first call detail record sub-groups are 1. An information gain calculation manner is subtracting, from an entropy (1) of the call detail record group on which grouping is performed, an entropy (0) of the call detail record sub-group obtained after grouping, to obtain the first information gain 1 of the first call detail record sub-group. In this embodiment, the call detail record group on which grouping is performed is the call detail record group shown in Table 9, and the call detail record sub-groups obtained after grouping are shown in Table 10 and Table 11.

In the example in Table 9, the "week" is used as the split point to further perform grouping, and the second call detail record sub-groups are shown in Table 12 and Table 13.

TABLE 10

| Service type | Service procedure | Caller home location | Callee home location | National toll call | Hour | Week | Charging duration (x) | Fee deduction (y) |
|---|---|---|---|---|---|---|---|---|
| Voice | Calling | Shenzhen | Shenzhen | No | 1 | One | 30 | 10 |
| Voice | Calling | Shenzhen | Shenzhen | No | 1 | Two | 40 | 20 |

TABLE 11

| Service type | Service procedure | Caller home location | Callee home location | National toll call | Hour | Week | Charging duration (x) | Fee deduction (y) |
|---|---|---|---|---|---|---|---|---|
| Voice | Calling | Shenzhen | Shenzhen | No | 16 | One | 30 | 20 |
| Voice | Calling | Shenzhen | Shenzhen | No | 16 | Two | 40 | 40 |

Entropies of the first call detail record sub-groups in Table 10 and Table 11 are calculated according to the formula 1,

TABLE 12

| Service type | Service procedure | Caller home location | Callee home location | National toll call | Hour | Week | Charging duration (x) | Fee deduction (y) |
|---|---|---|---|---|---|---|---|---|
| Voice | Calling | Shenzhen | Shenzhen | No | 16 | One | 30 | 20 |
| Voice | Calling | Shenzhen | Shenzhen | No | 1 | One | 30 | 10 |

TABLE 13

| Service type | Service procedure | Caller home location | Callee home location | National toll call | Hour | Week | Charging duration (x) | Fee deduction (y) |
|---|---|---|---|---|---|---|---|---|
| Voice | Calling | Shenzhen | Shenzhen | No | 16 | Two | 40 | 40 |
| Voice | Calling | Shenzhen | Shenzhen | No | 1 | Two | 40 | 20 |

Entropies of the second call detail record sub-groups in Table 12 and Table 13 are calculated according to the formula 1, the entropies of the second call detail record sub-groups are 1, and second information gains of the second call detail record sub-groups are 0. An information gain calculation manner is subtracting, from an entropy (1) of a call detail record group on which grouping is performed, an entropy (1) of the call detail record sub-group obtained after grouping, to obtain the second information gain 0 of the second call detail record sub-group.

It should be noted that a larger information gain indicates a smaller entropy of a call detail record sub-group obtained by performing grouping based on an added target charging element. It may be understood that a probability that a same charging unit (x) in the target call detail record sub-group corresponds to different fee deductions (y) is reduced.

A target charging element for which an information gain is largest is determined as a split point, to determine a call detail record sub-group. In this embodiment, the first information gain is greater than the second information gain. Therefore, the "hour" is used as the grouping split point. In this embodiment, the entropies of the first call detail record sub-groups in Table 10 and Table 11 are 0, and are less than the threshold (for example, the threshold is 0.001), and splitting the first call detail record sub-groups corresponding to Table 10 and Table 11 stops.

When an information gain is calculated, a week to which charging time belongs does not affect further grouping performed on a call detail record group. Therefore, deleting the second charging element (week) from the charging condition is deleting a redundant charging element. This can effectively reduce a data amount because reducing one charging element reduces the amount of data that needs to be processed. This can also effectively reduce a storage amount of the finally determined tariff data, and the tariff data is clearer because charging elements interfering with the tariff data are reduced. A charging condition after grouping is a service type, a service procedure, a caller home location, a callee home location, a national toll call, and an hour to which calling charging time belongs.

Further, similar call detail record groups may be combined. It may be understood that a call detail record group and a call detail record sub-group that meet the grouping condition may be combined, or at least two call detail record sub-groups that meet the grouping condition are combined, to obtain a call detail record group obtained after combination. The similar call detail record groups herein may be call detail record groups at a same tariff rate, and the same tariff rate is that a mapping relationship between a charging duration and a fee deduction is the same. Then step b may be repeatedly performed on the call detail record group obtained after combination, to verify whether the call detail record group obtained after combination meets the grouping condition. If the call detail record group obtained after combination meets the grouping condition, step 203 is performed. The similar call detail record groups are combined, so that efficiency of subsequently processing each call detail record group can be increased.

Step 203: Analyze the call detail record group, to obtain a data feature.

With reference to understanding of step 202, the call detail record group in this step may be: a call detail record group that meets the grouping condition and that is obtained after the initial grouping, or a call detail record group obtained after call detail record groups obtained after initial grouping are combined, or a call detail record group obtained after at least two call detail record sub-groups are combined, or a call detail record group obtained after a call detail record group obtained after the initial grouping and a call detail record sub-group obtained through splitting are combined.

When the data feature includes a pulse-based fee deduction value of the fee deduction, in the first example, different fee values corresponding to the fee deduction in the call detail record group are obtained. This is understood with reference to the following Table 14.

TABLE 14

| Charging duration (x) | Fee deduction (y) |
|---|---|
| 1 | 20 |
| 15 | 20 |
| 30 | 20 |
| 31 | 40 |
| 60 | 40 |
| 71 | 60 |
| 72 | 60 |
| . . . | . . . |

The different fee values corresponding to the fee deduction are sorted, as shown in the following Table 15. The sorting herein includes sorting in descending order or in ascending order. In this embodiment, an example in which the fee values are sorted in ascending order may be used for description.

TABLE 15

| Fee deduction (y) |
|---|
| 20 |
| 40 |
| 60 |
| . . . |

A difference between two consecutive sorted fee values is determined, as shown in Table 16.

TABLE 16

| | Difference between fee values |
|---|---|
| 20 − 0 | 20 |
| 40 − 20 | 20 |
| 60 − 40 | 20 |
| . . . | . . . |

The difference is a pulse-based fee deduction value.

It can be seen in Table 16 that the difference has only one fixed value 20. Therefore, one pulse-based fee deduction value is determined.

In the second example, the e fee deduction corresponding to the obtained charging duration is shown in the following Table 17.

TABLE 17

| Charging duration (x) | Fee deduction (y) |
|---|---|
| 1 | 20 |
| 15 | 20 |
| 30 | 20 |
| 31 | 40 |
| 60 | 40 |
| 61 | 50 |
| 72 | 50 |
| 90 | 50 |

TABLE 17-continued

| Charging duration (x) | Fee deduction (y) |
|---|---|
| 91 | 60 |
| 120 | 70 |
| ... | ... |

Then the different fee values corresponding to the fee deduction are sorted, as shown in Table 18.

TABLE 18

| Fee deduction (y) |
|---|
| 20 |
| 40 |
| 50 |
| 60 |
| 70 |
| ... |

A difference between two consecutive sorted fee values is determined, as shown in Table 19.

TABLE 19

| | Difference between fee values |
|---|---|
| 20 − 0 | 20 |
| 40 − 20 | 20 |
| 50 − 40 | 10 |
| 60 − 50 | 10 |
| 70 − 60 | 10 |
| ... | |

It may be learned from Table 19 that differences between the fee values are calculated after the fee deductions (y) are sorted. The obtained differences 20, 20, 10, 10, and 10 are pulse-based fee deduction values. There are two different differences (20 and 10), and two pulse-based fee deduction values are determined.

It should be noted that the voice service is used as an example for description in this embodiment of the present application. Therefore, the charging units are described by using the charging duration as an example. Certainly, charging units for different services may be different. For example, in a short message service or a multimedia messaging service, a charging unit can be a charging quantity; in a data service, a charging unit can be billed traffic.

Step 204: Select, from a preset tariff model based on the data feature, a target tariff model corresponding to the data feature, where a tariff model is used to calculate the fee deduction based on the charging unit.

In the first example in step 203, when there is one pulse-based fee deduction value, a first tariff model is selected from the preset tariff model as the target tariff model. The preset tariff model includes a plurality of tariff models. In this embodiment, a simple tariff model and a grade-based tariff model are used as an example for description. In actual application, specific formats and a quantity of tariff models in the preset tariff model are not limited.

The first tariff model is a simple tariff model, and a format of the first tariff model is as follows:

$$y = unitFee^* \text{ceil}\left(\frac{x}{pulse}\right),$$

where y represents a fee deduction, x represents a charging duration, unitFee represents a pulse-based fee deduction value, pulse represents a minimum charging duration unit, ceil represents a ceiling function, namely, rounding up, and in the model, there is one unitFee.

For example, 1 yuan (equivalent to 100 cents) is often deducted for 60 seconds or a part of 60 seconds in a corresponding charging system. This is substituted into the foregoing formula, and $$y = 100^* \text{ceil}\left(\frac{x}{60}\right).$$

When x=30, y=100.

In the second example in step 203, when there are at least two pulse-based fee deduction values, a second tariff model is selected from the preset tariff model as the target tariff model.

The second tariff model is a grade-based tariff model, and a format of the second tariff model is as follows:

For ease of description, in this embodiment, a grade-based tariff model including only one break point (breakpoint) is used as an example for description. In actual application, a quantity of break points in a grade-based tariff model is not limited.

A break point is a charging duration corresponding to a demarcation point of different pulse-based fee deduction values.

With reference to Table 17 and Table 19 for understanding, in Table 19, the pulse-based fee deduction values are 20, 20, 10, 10, and 10. In Table 17, when a pulse-based fee deduction value changes (from 20 to 10), a corresponding charging duration is 60, and it indicates that the charging duration 60 is a break point.

When the charging duration is less than the break point, the tariff model is:

$$y = unitFee_1^* \text{Ceil}\left(\frac{x}{pulse_1}\right), x \leq breakPoint1;$$

or when the charging duration exceeds the break point, the tariff model is:

$$y = unitFee1^* \text{Ceil}\left(\frac{breakPoint1}{pulse_1}\right) + unitFee_2^* \text{Ceil}\left(\frac{(x - breakPoint1)}{pulse_2}\right),$$

$x > breakPoint1,$ where unitFee1 represents a pulse-based fee deduction value when a charging duration ranges from 0 to a breakpoint1; $pulse_1$ represents a pulse when the charging duration ranges from 0 to the breakpoint1; $unitFee_2$ represents a pulse-based fee deduction value when the charging duration is greater than the breakpoint1; and $pulse_2$ represents a pulse when the charging duration is greater than the breakpoint1.

For example, a tariff rate is 50 cents for 60 seconds when charging time is within three minutes, or 10 cents for 30 seconds or a part of 30 seconds when a charging time exceeds three minutes, unitFee1 is 0.5 yuan, $pulse_1$ is 60 seconds, breakPoint1 is 3 minutes, $unitFee_2$ is 0.1 yuan, and $pulse_2$ is 30 seconds.

Step 205: Determine, based on the data feature, a parameter value corresponding to each tariff parameter in the target tariff model.

A tariff rate may include a tariff model and a tariff parameter corresponding to the tariff model. The tariff parameter includes a pulse and a pulse-based fee deduction value. For example, in the simple tariff model $$y = 100^* \text{ceil}\left(\frac{x}{60}\right),$$

each corresponding tariff parameter and a parameter value are a pulse-based fee deduction value 100 and a pulse 60.

(1) A pulse is determined based on a minimum value and a maximum value of a charging duration corresponding to a same fee value, and description is provided by using the example shown in Table 14. This is understood with reference to the following Table 20.

TABLE 20

| y | x (minimum value, maximum value) |
|---|---|
| 20 | (1, 30) |
| 40 | (31, 60) |
| 60 | (71, 72) |

The pulse is determined based on the minimum value and the maximum value that are shown in Table 20 and that correspond to the charging duration corresponding to the same fee value. Because a pulse indicates a minimum charging duration unit, deduction is performed when a charging time exceeds a minimum duration unit (a pulse). In the example in Table 20, a corresponding fee value is deducted when a charging time exceeds a duration of 20 seconds. Because a call detail record group may include a large quantity of call detail records, each call detail record includes one charging duration and a fee deduction corresponding to the charging duration. The same fee value included in the large quantity of call detail records may correspond to values of a plurality of charging durations. For example, in Table 14, the fee value 20 corresponds to the charging durations 1, 15, and 30. When the charging duration is 31, the fee value changes, and a fee value 30 is a critical value for which the fee deduction changes. In this way, a minimum charging duration unit is probably determined based on a maximum value and a minimum value that correspond to charging durations corresponding to a same fee value (it may be understood that a fee value corresponding to a fee deduction changes when a charging time exceeds one charging duration). Refer to the following Table 21.

TABLE 21

| y | Pulse |
|---|---|
| 20 | 30 = 30 − 1 + 1 |
| 40 | 30 = 60 − 31 + 1 |
| 60 | 2 = 72 − 71 + 1 |

As shown in Table 21, a set of calculated pulses is (30, 2).

(2) Determining a pulse-based fee deduction value: In the example in Table 15, if a difference between fee values of the fee deduction is a fixed value 20, the difference is used as the pulse-based fee deduction value.

As shown in the following Table 22, a candidate parameter value set determined according to step (1) and step (2) includes a first parameter value and a second parameter value.

TABLE 22

| First parameter value | unitFee = 20, pulse = 30 |
| Second parameter value | unitFee = 20, pulse = 2 |

The first parameter value and the second parameter value in the candidate parameter value set are separately substituted into the selected target tariff model (for example, the simple tariff model), and correctness of the first parameter value and correctness of the second parameter value are separately verified based on a mapping relationship between the charging duration (x) and the fee deduction (y) that is stored in step 202. The first parameter value (unitFee=20, pulse=30) conforms to the stored mapping relationship between the charging duration and the fee deduction, and it is determined that the first parameter value is a parameter value corresponding to a final target tariff model.

Step 206: Determine tariff data based on the parameter value, the target tariff model, and the charging condition.

A tariff rate of the group data is derived, for example, $$y = 20^* \text{ceil}\left(\frac{x}{30}\right)$$

that is physically 20 cents for 30 seconds and a part of 30 seconds.

For example, the tariff data may be shown in the following Table 23.

TABLE 23

| Charging condition | | | | | | |
|---|---|---|---|---|---|---|
| Service type | Service procedure | Caller home location | Callee home location | A caller roams | Call type | Description of a tariff rate |
| Voice | Calling | Shenzhen | Shenzhen | No | Local | 0.2 yuan for 30 seconds or a part of 30 seconds |

It should be noted that the example of the tariff data is provided only for ease of description, and does not impose limitations on this application.

Step 207: Combine tariff data with a same package identifier based on a package identifier carried in the call detail record, to obtain package tariff data.

Each call detail record in the call detail record set carries the package identifier, and the package identifier is used to indicate a tariff package to which the call detail record belongs, to obtain the package tariff data. Tariffs corresponding to charging conditions in a same package are integrated together. For example, tariff rates corresponding to a voice, data, a short message service message, and a multimedia message in a package A are integrated in a tree-like structure, so that a user can make a convenient check and analysis subsequently.

For example, tariff data in the package A may include a voice tariff, a data service tariff, a short message service tariff, and a multimedia messaging service tariff. For example, a voice package has a monthly function fee of 20 yuan, a call may be free for a maximum of 60 minutes, and calling time exceeding the 60 minutes is billed based on 0.5 yuan/minute. A short message service message package has a monthly function fee of 10 yuan, a maximum of 200 short message service messages may be sent for free, and a quantity exceeding 200 is billed based on 0.1 yuan for each short message service message. A data package has a monthly function fee of 20 yuan, a maximum of 50 mega of traffic may be obtained for free, and traffic exceeding the 50 mega is billed based on three yuan/mega.

Optionally, if charging conditions corresponding to two different tariff rates are different only in time interval, the charging conditions may be combined. Refer to tariff data in the following Table 24.

TABLE 24

| | | Charging condition | | | | |
|---|---|---|---|---|---|---|
| Service type | Service procedure | Caller home location | Callee home location | A caller roams | Call type | Tariff rate |
| Voice | Calling | Shenzhen | Shenzhen | No | Local | 07:00 to 24:00: 0.2 yuan for 30 seconds or a part of 30 seconds 00:00 to 07:00: 0.1 yuan for 30 seconds or a part of 30 seconds |

It should be noted that step 207 is an optional step, and might not be performed in all implementations.

Further, the determined package tariff data or the determined tariff data is stored, and the tariff data is stored in the storage server, to support a new charging server in subsequent rating and a call detail record comparison server in comparing fee deductions of new and old call detail records.

In the prior art, the call detail records in the old charging system are determined by continuously manually modifying the call detail records in the old charging system, to obtain tariff data in the old charging system. Instead, in this embodiment of the present application, because a large quantity of call detail records in the old charging system include charging elements, charging durations, and fee deductions, data in the large quantity of call detail records in the old charging system are used to obtain the tariff data, thereby greatly reducing manual dependence, increasing efficiency of determining the data in the old charging system, and reducing computing resources and human resources.

Figure 5:
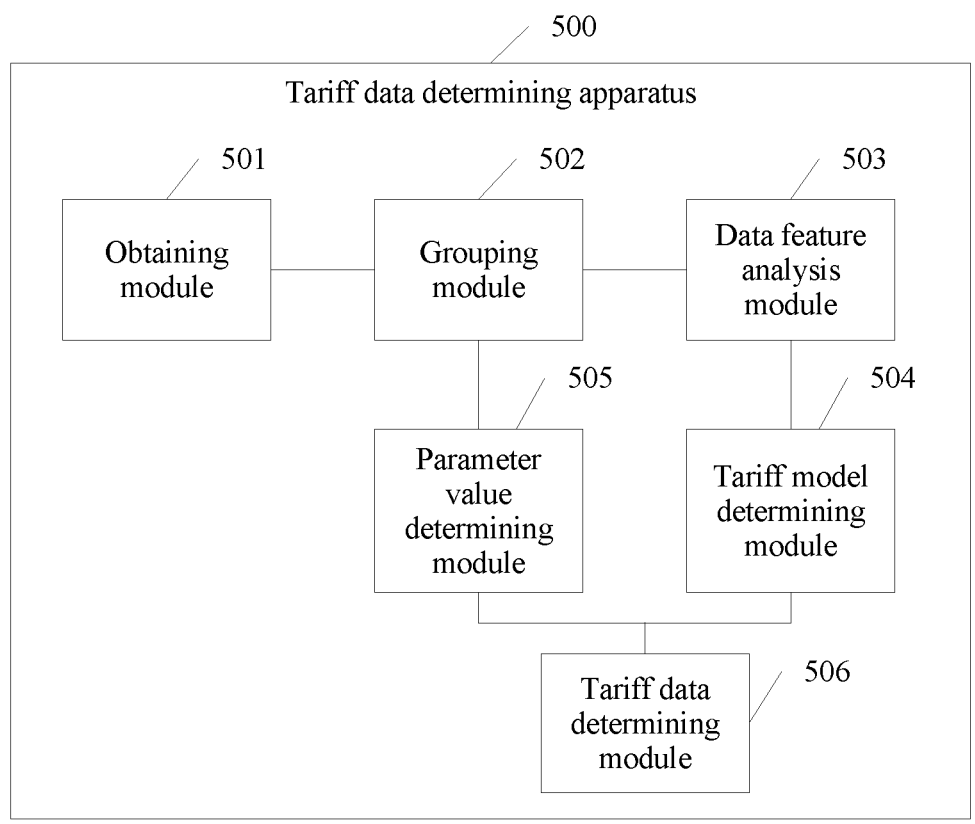
FIG. 5 is a schematic structural diagram of a tariff data determining apparatus according to the embodiments of the present application.

The tariff data determining method in the embodiments of the present application is described above in detail, and a tariff data determining apparatus to which the tariff data determining method is applied is described below. The determining apparatus may exist in a form of a server. Referring to FIG. 5, the embodiments of the present application provide an embodiment of a tariff data determining apparatus 500, and the tariff data determining apparatus 500 includes:

an obtaining module 501, configured to obtain a call detail record set, where each call detail record in the call detail record set includes a charging condition, and a charging unit and a fee deduction that are under the charging condition;

a grouping module 502, configured to group, according to a preset rule, a plurality of call detail records in the call detail record set obtained by the obtaining module 501, to obtain a call detail record group, where a same value corresponding to a charging unit in the call detail record group has a correspondence with a unique fee value corresponding to a fee deduction;

a data feature analysis module 503, configured to analyze the call detail record group obtained by the grouping module 502, to obtain a data feature;

a tariff model determining module 504, configured to select, from a preset tariff model based on the data feature obtained by the data feature analysis module 503, a target tariff model corresponding to the data feature, where a tariff model is used to calculate the fee deduction based on the charging unit;

a parameter value determining module 505, configured to determine, based on the value corresponding to the charging unit and the fee value corresponding to the fee deduction in the call detail record group obtained by the grouping module 502, a parameter value corresponding to each tariff parameter in the target tariff model; and a tariff data determining module 506, configured to determine tariff data based on the parameter value determined by the parameter value determining module 505, the target tariff model determined by the tariff model determining module 504, and the charging condition.

Optionally, the grouping module 502 is further configured to group the plurality of call detail records in the call detail record set based on a preset charging element in a plurality of charging elements, to obtain the call detail record group, where the same preset charging element in the call detail record group corresponds to the same element value.

Optionally, the grouping module 502 is further specifically configured to:

determine a target charging element in the call detail record group when the same value corresponding to the charging unit has a correspondence with at least two fee values corresponding to the fee deduction, where the target charging element corresponds to at least two different element values; and call detail record groups having the same target element value into one group, to obtain at least two target call detail record sub-groups, where when a same value corresponding to a charging unit in each target call detail record sub-group has a correspondence with a unique fee value corresponding to a fee deduction, the at least two target call detail record sub-groups are the call detail record group, and the target element value is an element value corresponding to the target charging element.

Optionally, the grouping module 502 is further specifically configured to:

calculate an entropy of data in the call detail record group according to the following formula:

$$\sum_i \sum_j \frac{|D_i|}{|D|}(-1)p_{ij}\log_2 p_{ij},$$

where

D represents a quantity of call detail records in the call detail record group, $D_i$ represents a quantity of times that a charging unit i appears, and $P_{ij}$ represents a probability that a fee deduction i appears in the charging unit j; and if the entropy is greater than a threshold, two or more fee values of the fee deduction have a correspondence with the same value corresponding to the charging unit; or if the entropy is less than or equal to a threshold, one fee value of the fee deduction has a correspondence with the same value corresponding to the charging unit.

Figure 6:
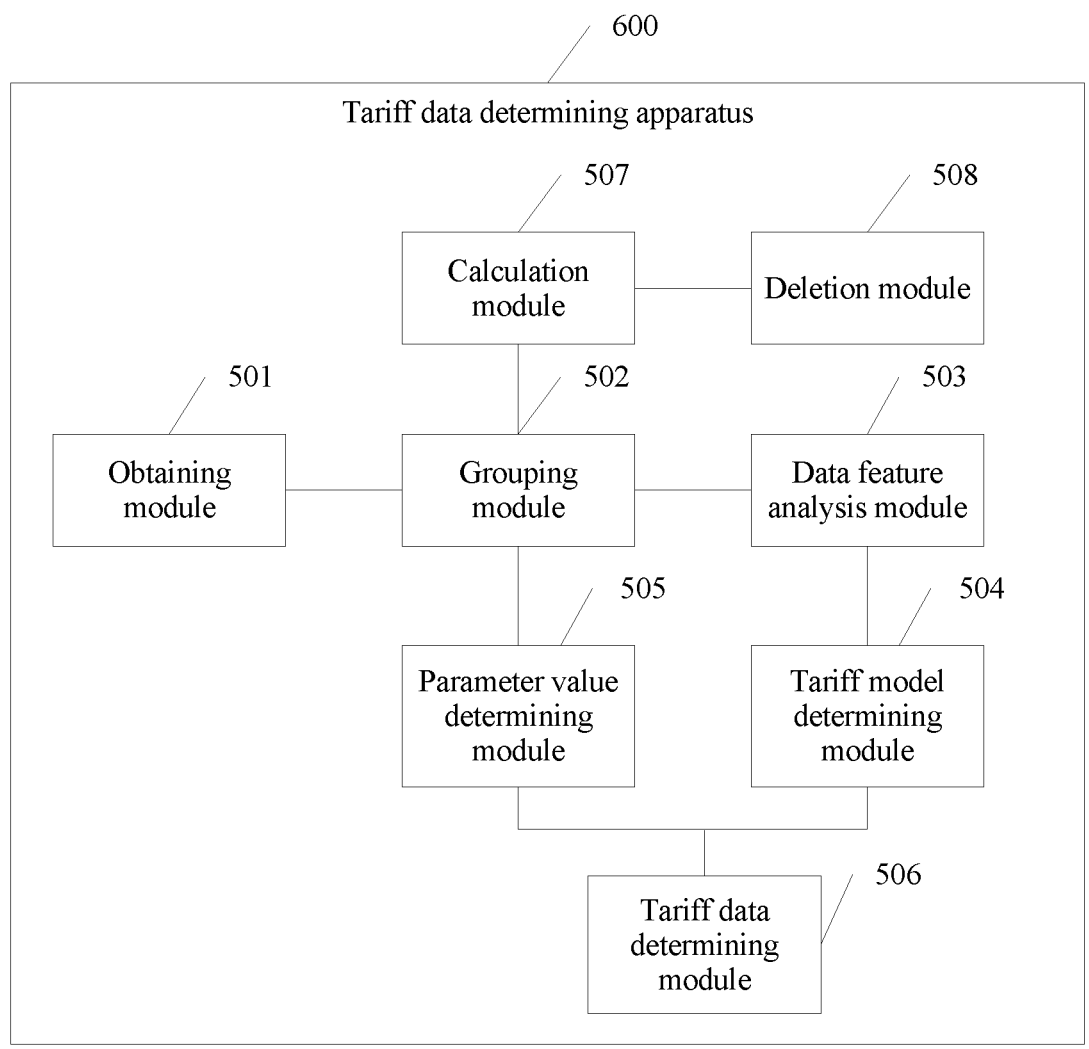
FIG. 6 is a schematic structural diagram of a tariff data determining apparatus according to another embodiment of the present application.

Referring to FIG. 6, based on the embodiment corresponding to FIG. 5, the embodiments of the present application further provide an embodiment of a tariff data determining apparatus 600, and the tariff data determining apparatus 600 includes:

a calculation module 507 and a deletion module 508.

When the target charging element includes a first charging element and a second charging element, the grouping module 502 is further specifically configured to:

call detail record groups having a same first element value into one group, to obtain at least two first call detail record sub-groups, where the first element value is an element value corresponding to the first charging element; and call detail record groups having the same second element value into one group, to obtain at least two second call detail record sub-groups, where the second element value is an element value corresponding to the second charging element.

The calculation module 507 is further configured to: calculate a first information gain of the first call detail record sub-group that is determined by the grouping module 502 and that is relative to the call detail record group, and calculate a second information gain of the second call detail record sub-group that is determined by the grouping module 502 and that is relative to the call detail record group.

The deletion module 508 is configured to delete the second charging element from the plurality of charging elements when the calculation module 507 determines that the first information gain is greater than the second information gain.

Figure 7:
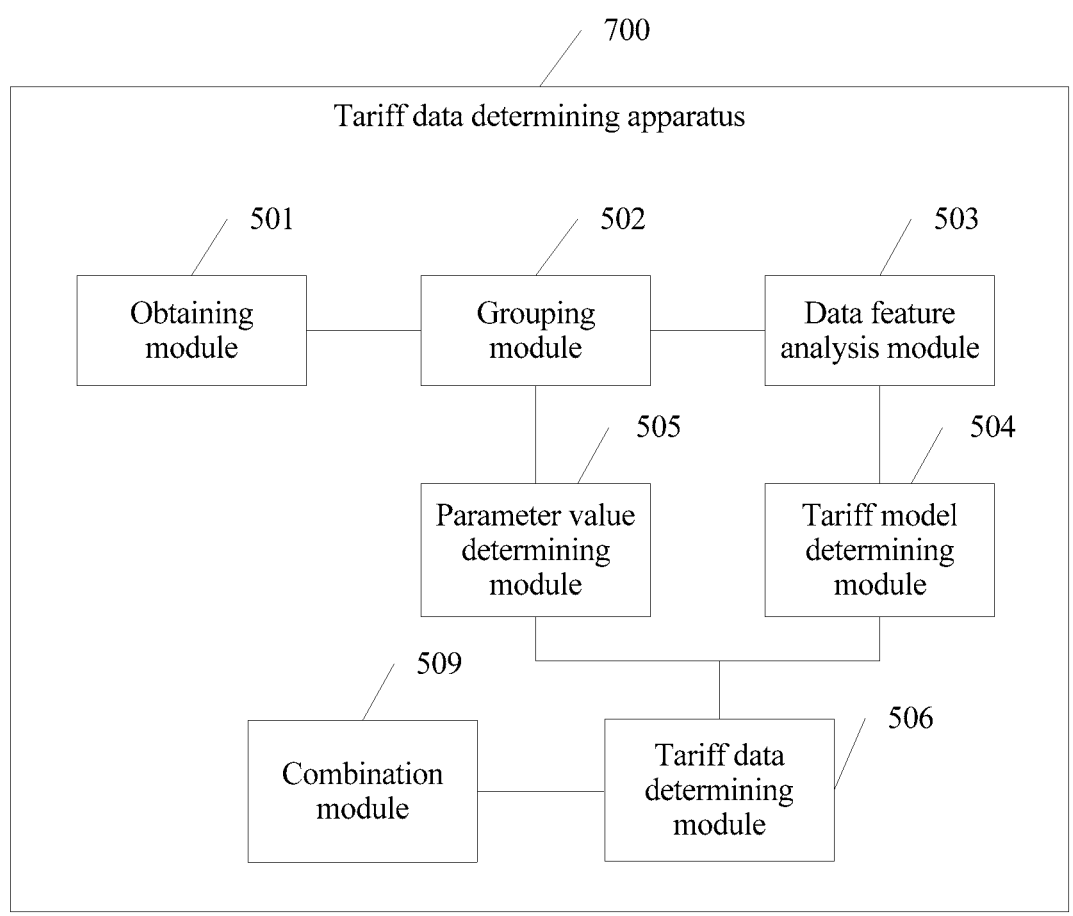
FIG. 7 is a schematic structural diagram of a tariff data determining apparatus according to another embodiment of the present application.

Referring to FIG. 7, based on the embodiment corresponding to FIG. 5, the embodiments of the present application further provide an embodiment of a tariff data determining apparatus 700.

Each call detail record in the call detail record set carries a package identifier, and the package identifier is used to indicate a tariff package to which the call detail record belongs.

The tariff data determining apparatus further includes a combination module 509.

The combination module 509 is configured to combine tariff data with a same package identifier based on the package identifier carried in the call detail record, to obtain package tariff data, where the tariff data is determined by the tariff data determining module 506.

Optionally, a pulse is used to indicate a minimum charging unit, a pulse-based fee deduction value is used to indicate a fee value corresponding to the pulse, and the data feature analysis module 503 is further specifically configured to:

obtain different fee values corresponding to the fee deduction in the call detail record group;

sort the different fee values;

determine a difference between two consecutive sorted fee values, where the difference is the pulse-based fee deduction value; and determine a quantity of different pulse-based fee deduction values.

Optionally, the tariff model determining module 504 is further specifically configured to:

select a first tariff model from the preset tariff model as the target tariff model if there is one pulse-based fee deduction value; or select a second tariff model from the preset tariff model as the target tariff model if there are at least two pulse-based fee deduction values.

Further, the tariff data determining apparatuses in FIG. 5 to FIG. 7 are presented in a form of function modules. A "module" herein may be an application-specific integrated circuit (application-specific integrated circuit, ASIC), a circuit, a processor and a memory that execute one or more software programs or firmware programs, an integrated logic circuit, and/or another component that can provide the foregoing functions. In a simple embodiment, the tariff data determining apparatuses in FIG. 5 to FIG. 7 may use a form shown in FIG. 8.

Figure 8:
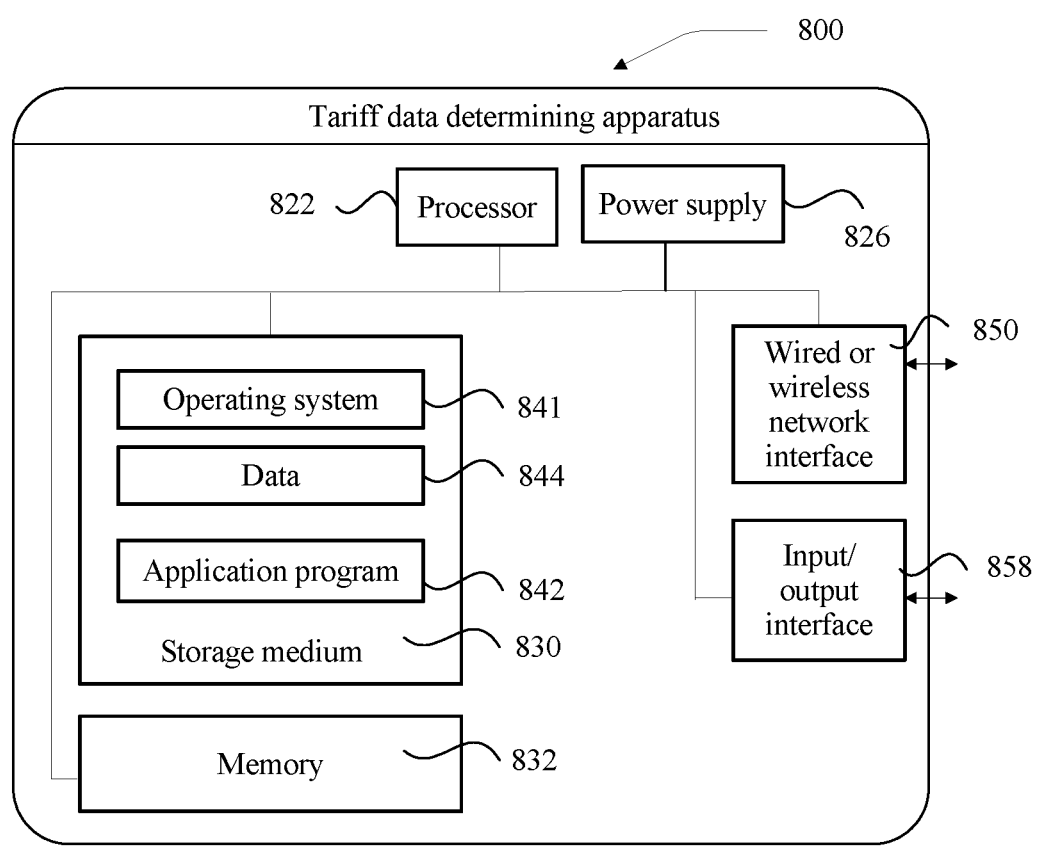
FIG. 8 is a schematic structural diagram of a tariff data determining apparatus according to another of the present application.

FIG. 8 shows a tariff data determining apparatus 800 provided in an embodiment of the present application. The tariff data determining apparatus may exist in a form of a server. In this embodiment of the present application, description is provided by using an example in which the determining apparatus 800 is a server. The server 800 may vary greatly due to different configurations or different performance, and may include one or more processors 800 and memories 832, and one or more storage media 830 (for example, one or more mass storage devices) storing an application program 842 or data 844. The memory 832 and the storage media 830 may be temporary storage or persistent storage. Programs stored in the storage media 830 may include one or more modules (not marked in the figure), and each module may include a series of instruction operations on the server. Further, the processor 822 may be configured to: communicate with the storage media 830, and perform, on the server 800, a series of instruction operations that are in the storage media 830.

The server 800 may further include one or more power supplies 826, one or more wired or wireless network interfaces 850, one or more input/output interfaces 858, and/or one or more operating systems 841, such as Windows Server, Mac OS X, Unix, Linux, and FreeBSD.

The network interface 850 is configured to obtain a call detail record set, where each call detail record in the call detail record set includes a charging condition, and a charging unit and a fee deduction that are under the charging condition.

The processor 822 is configured to: group, according to a preset rule, a plurality of call detail records in a call detail record set obtained by the network interface 850, to obtain a call detail record group, where a same value corresponding to a charging unit in the call detail record group has a correspondence with a unique fee value corresponding to a fee deduction; analyze the call detail record group, to obtain a data feature; select, from a preset tariff model based on the data feature, a target tariff model corresponding to the data feature, where a tariff model is used to calculate the fee deduction based on the charging unit; determine, based on the value corresponding to the charging unit and the fee value corresponding to the fee deduction in the call detail record group, a parameter value corresponding to each tariff parameter in the target tariff model; and determine tariff data based on the parameter value, the target tariff model, and the charging condition.

Optionally, the charging condition includes a plurality of charging elements; and the processor 822 is further configured to group the plurality of call detail records in the call detail record set based on a preset charging element in the plurality of charging elements, to obtain the call detail record group, where a same preset charging element in the call detail record group is corresponding to a same element value.

Optionally, the processor 822 is further configured to: determine a target charging element in the call detail record group when the same value corresponding to the charging unit has a correspondence with at least two fee values corresponding to the fee deduction, where the target charging element corresponds to at least two different element values; and call detail record groups having a same target element value into one group, to obtain at least two target call detail record sub-groups, where when a same value corresponding to a charging unit in each target call detail record sub-group has a correspondence with a unique fee value corresponding to a fee deduction, the at least two target call detail record sub-groups are the call detail record group, and the target element value is an element value corresponding to the target charging element.

Optionally, the processor 822 is further configured to: calculate an entropy of data in the call detail record group according to the following formula:

$$\sum_i \sum_j \frac{|D_i|}{|D|}(-1)p_{ij}\log_2 p_{ij},$$

where

D represents a quantity of call detail records in the call detail record group, Di represents a quantity of times that a charging unit i appears, and $P_{ij}$ represents a probability that a fee deduction i appears in the charging unit j; and if the entropy is greater than a threshold, determine that two or more fee values of the fee deduction have a correspondence with the same value corresponding to the charging unit; or if the entropy is less than or equal to a threshold, determine that one fee value of the fee deduction has a correspondence with the same value corresponding to the charging unit.

Optionally, when the target charging element includes a first charging element and a second charging element, the processor 822 is further configured to: call detail record groups having a same first element value into one group, to obtain at least two first call detail record sub-groups, where the first element value is an element value corresponding to the first charging element; call detail record groups having a same second element value into one group, to obtain at least two second call detail record sub-groups, where the second element value is an element value corresponding to the second charging element; calculate a first information gain of the first call detail record sub-group relative to the call detail record group the first information gain, and calculate a second information gain of the second call detail record sub-group relative to the call detail record group; and delete the second charging element from the plurality of charging elements if the first information gain is greater than the second information gain.

Optionally, each call detail record in the call detail record set carries a package identifier, and the package identifier is used to indicate a tariff package to which the call detail record belongs.

The processor 822 is further configured to combine tariff data with a same package identifier based on the package identifier carried in the call detail record, to obtain package tariff data.

Optionally, when the data feature includes a quantity of pulse-based fee deduction values of the fee deduction, a pulse is used to indicate a minimum charging unit, and the pulse-based fee deduction value is used to indicate a fee value corresponding to the pulse.

The processor 822 is further configured to: obtain different fee values corresponding to the fee deduction in the call detail record group; sort the different fee values; determine a difference between two consecutive sorted fee values, where the difference is the pulse-based fee deduction value; and determine a quantity of different pulse-based fee deduction values.

The processor 822 is further configured to: when there is one pulse-based fee deduction value, select a first tariff model from the preset tariff model as the target tariff model; and when there are at least two pulse-based fee deduction values, select a second tariff model from the preset tariff model as the target tariff model.

An embodiment of the present application further provides a computer storage medium, configured to store a computer software instruction used on the tariff data determining apparatus shown in FIG. 8, where the computer storage medium includes a program designed to perform the foregoing method embodiment. A resource may be obtained by executing the stored program.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A method for creating a database and determining tariff data, comprising:

obtaining a call detail record set that includes multiple call detail records, wherein each call detail record in the call detail record set comprises a charging condition, a charging unit and a fee deduction that correspond to the charging condition;

grouping and storing a plurality of call detail records in the call detail record set according to a preset rule, to obtain a call detail record group, wherein a specified value corresponding to a charging unit in the call detail record group has a correspondence with a unique fee value corresponding to a fee deduction;

analyzing the fee value corresponding to the fee deduction in the call detail record group, to obtain a data feature;

selecting, from a preset tariff model based on the data feature, a target tariff model corresponding to the data feature, wherein a tariff model is used to calculate the fee deduction based on the charging unit;

determining, based on the value corresponding to the charging unit and the fee value corresponding to the fee deduction in the call detail record group, a parameter value corresponding to each tariff parameter in the target tariff model; and determining tariff data based on the parameter value, the target tariff model, and the charging condition.

2. The method according to claim 1, wherein the charging condition comprises a plurality of charging elements, and the grouping a plurality of call detail records in the call detail record set according to a preset rule, to obtain a call detail record group comprises:

grouping the plurality of call detail records in the call detail record set based on a preset charging element in the plurality of charging elements, to obtain the call detail record group, wherein a same preset charging element in the call detail record group is corresponding to a same element value.

3. The method according to claim 2, wherein the method further comprises:

determining a target charging element in the call detail record group when the same value corresponding to the charging unit has a correspondence with at least two fee values corresponding to the fee deduction, wherein the target charging element corresponds to at least two different element values; and grouping and storing call detail records having a same target element value into one group, to obtain at least two target call detail record sub-groups, wherein when a same value corresponding to a charging unit in each target call detail record sub-group has a correspondence with a unique fee value corresponding to a fee deduction, the at least two target call detail record sub-groups are the call detail record group, and the target element value is an element value corresponding to the target charging element.

4. The method according to claim 3, wherein the method further comprises:

calculating an entropy of data in the call detail record group according to the following formula:

$$\sum_i \sum_j \frac{|D_i|}{|D|}(-1)p_{ij}\log_2 p_{ij},$$

wherein

D represents a quantity of call detail records in the call detail record group, Di represents a quantity of times that a charging unit i appears, and $P_{ij}$ represents a probability that a fee deduction j appears in the charging unit i; and if the entropy is greater than a threshold, determining that two or more fee values of the fee deduction have a correspondence with the same value corresponding to the charging unit; or if the entropy is less than or equal to a threshold, determining that one fee value of the fee deduction has a correspondence with the same value corresponding to the charging unit.

5. The method according to claim 3, wherein when the target charging element comprises a first charging element and a second charging element, the grouping call detail records having a same target element value into one group, to obtain at least two target call detail record sub-groups comprises:

grouping and storing call detail records having a same first element value into one group, to obtain at least two first call detail record sub-groups, wherein the first element value is an element value corresponding to the first charging element; and grouping call detail records having a same second element value into one group, to obtain at least two second call detail record sub-groups, wherein the second element value is an element value corresponding to the second charging element; and the method further comprises:

calculating a first information gain of the first call detail record sub-group relative to the call detail record group, and calculating a second information gain of the second call detail record sub-group relative to the call detail record group; and deleting the second charging element from the plurality of charging elements if the first information gain is greater than the second information gain.

6. The method according to claim 1, wherein each call detail record in the call detail record set carries a package identifier, the package identifier is used to indicate a tariff package to which the call detail record belongs, and after the determining tariff data based on the parameter value, the target tariff model, and the charging condition, the method further comprises:
combining tariff data with a same package identifier based on the package identifier carried in the call detail record, to obtain package tariff data.

7. The method according to claim 1, wherein when the data feature comprises a quantity of pulse-based fee deduction values of the fee deduction, a pulse is used to indicate a minimum charging unit, a pulse-based fee deduction value is used to indicate a fee value corresponding to the pulse, and the analyzing the fee value corresponding to the fee deduction of the call detail record group, to obtain a data feature comprises:
obtaining different fee values corresponding to the fee deduction in the call detail record group;
sorting the different fee values;
determining a difference between two consecutive sorted fee values, wherein the difference is the pulse-based fee deduction value; and
determining a quantity of different pulse-based fee deduction values.

8. The method according to claim 7, wherein
the selecting, from a preset tariff model based on the data feature, a target tariff model corresponding to the data feature comprises:
selecting a first tariff model from the preset tariff model as the target tariff model if there is one pulse-based fee deduction value; or
selecting a second tariff model from the preset tariff model as the target tariff model if there are at least two pulse-based fee deduction values.

9. The method according to claim 1, wherein
the charging unit comprises a charging duration of a voice service, billed traffic of a data service, a quantity of billed short message services, and a quantity of billed multimedia messaging services.

10. An apparatus, comprising:
at least one processor;
a non-transitory computer-readable storage medium coupled to the at least one processor and storing programming instructions for execution by the at least one processor, wherein the programming instructions instruct the at least one processor to:
obtain a call detail record set, wherein each call detail record in the call detail record set comprises a charging condition, and a charging unit and a fee deduction that are under the charging condition;
group and store, according to a preset rule, a plurality of call detail records in the call detail record set obtained by the obtaining module, to obtain a call detail record group, wherein a same value corresponding to a charging unit in the call detail record group has a correspondence with a unique fee value corresponding to a fee deduction;
analyze the fee value corresponding to the fee deduction in the call detail record group obtained by the grouping module, to obtain a data feature;
select, from a preset tariff model based on the data feature obtained by the data feature analysis module, a target tariff model corresponding to the data feature, wherein a tariff model is used to calculate the fee deduction based on the charging unit;
determine, based on the value corresponding to the charging unit and the fee value corresponding to the fee deduction in the call detail record group, a parameter value corresponding to each tariff parameter in the target tariff model; and
determine tariff data based on the parameter value determined by the parameter value determining module, the target tariff model determined by the tariff model determining module, and the charging condition.

11. The apparatus according to claim 10, wherein the programming instructions instruct the at least one processor to:
group and store the plurality of call detail records in the call detail record set based on a preset charging element in a plurality of charging elements, to obtain the call detail record group, wherein a same preset charging element in the call detail record group is corresponding to a same element value.

12. The apparatus according to claim 11, wherein the programming instructions instruct the at least one processor to:
determine a target charging element in the call detail record group when the same value corresponding to the charging unit has a correspondence with at least two fee values corresponding to the fee deduction, wherein the target charging element corresponds to at least two different element values; and
call detail record groups having a same target element value into one group, to obtain at least two target call detail record sub-groups, wherein
when a same value corresponding to a charging unit in each target call detail record sub-group has a correspondence with a unique fee value corresponding to a fee deduction, the at least two target call detail record sub-groups are the call detail record group, and the target element value is an element value corresponding to the target charging element.

13. The apparatus according to claim 12, wherein the programming instructions instruct the at least one processor to:
calculate an entropy of data in the call detail record group according to the following formula:

$$\sum_i \sum_j \frac{|D_i|}{|D|}(-1)p_{ij}\log_2 p_{ij},$$

wherein
D represents a quantity of call detail records in the call detail record group, Di represents a quantity of times that a charging unit i appears, and $P_{ij}$ represents a probability that a fee deduction i appears in the charging unit j; and
if the entropy is greater than a threshold, determine that two or more fee values of the fee deduction have a correspondence with the same value corresponding to the charging unit; or
if the entropy is less than or equal to a threshold, determine that one fee value of the fee deduction has a correspondence with the same value corresponding to the charging unit.

14. The apparatus according to claim 12, wherein when the target charging element comprises a first charging element and a second charging element, the programming instructions instruct the at least one processor to:
obtain, when call detail record groups having a same first element value into one group, at least two first call detail record sub-groups, wherein the first element value is an element value corresponding to the first charging element; and obtain, when call detail record groups having a same second element value into one group, at least two second call detail record sub-groups, wherein the second element value is an element value corresponding to the second charging element; and the programming instructions instruct the at least one processor to calculate a first information gain of the first call detail record sub-group that is determined by the grouping module and that is relative to the call detail record group, and calculate a second information gain of the second call detail record sub-group that is determined by the grouping module and that is relative to the call detail record group; and delete the second charging element from the plurality of charging elements when the calculation module determines that the first information gain is greater than the second information gain.

15. The apparatus according to claim 10, wherein each call detail record in the call detail record set carries a package identifier, the package identifier is used to indicate a tariff package to which the call detail record belongs, and the programming instructions instruct the at least one processor to:

combine tariff data with a same package identifier based on the package identifier carried in the call detail record, to obtain package tariff data, wherein the tariff data is determined by the tariff data determining module.

16. The apparatus according to claim 10, wherein a pulse is used to indicate a minimum charging unit, a pulse-based fee deduction value is used to indicate a fee value corresponding to the pulse, and the programming instructions instruct the at least one processor to:

obtain different fee values corresponding to the fee deduction in the call detail record group;

sort the different fee values;

determine a difference between two consecutive sorted fee values, wherein the difference is the pulse-based fee deduction value; and determine a quantity of different pulse-based fee deduction values.

17. The apparatus according to claim 16, wherein the programming instructions instruct the at least one processor to:

select a first tariff model from the preset tariff model as the target tariff model if there is one pulse-based fee deduction value; or select a second tariff model from the preset tariff model as the target tariff model if there are at least two pulse-based fee deduction values.

18. A tariff data determining apparatus, comprising:

a memory, configured to store computer executable program code;

a network interface, and a processor, coupled to the memory and the network interface, wherein the program code comprises an instruction, and when the processor executes the instruction, the instruction enables the determining apparatus to perform the following operations:

obtaining a call detail record set, wherein each call detail record in the call detail record set comprises a charging condition, and a charging unit and a fee deduction that are under the charging condition;

grouping and storing a plurality of call detail records in the call detail record set according to a preset rule, to obtain a call detail record group, wherein a same value corresponding to a charging unit in the call detail record group has a correspondence with a unique fee value corresponding to a fee deduction;

analyzing the call detail record group, to obtain a data feature;

selecting, from a preset tariff model based on the data feature, a target tariff model corresponding to the data feature, wherein a tariff model is used to calculate the fee deduction based on the charging unit;

determining, based on the value corresponding to the charging unit and the fee value corresponding to the fee deduction in the call detail record group, a parameter value corresponding to each tariff parameter in the target tariff model; and determining tariff data based on the parameter value, the target tariff model, and the charging condition.

* * * * *